United States Patent
Ooyanagi

(10) Patent No.: US 9,571,670 B2
(45) Date of Patent: Feb. 14, 2017

(54) INSPECTION APPARATUS, INSPECTION METHOD, INSPECTION SYSTEM, AND COMPUTER-READABLE STORAGE MEDIUM

(71) Applicant: CANON KABUSHIKI KAISHA, Tokyo (JP)

(72) Inventor: Maho Ooyanagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 13/682,529

(22) Filed: Nov. 20, 2012

(65) Prior Publication Data

US 2013/0148143 A1    Jun. 13, 2013

(30) Foreign Application Priority Data

Nov. 22, 2011 (JP) ................. 2011-254848

(51) Int. Cl.
G06K 15/00 (2006.01)
H04N 1/00 (2006.01)

(52) U.S. Cl.
CPC ...... *H04N 1/00015* (2013.01); *H04N 1/00005* (2013.01); *H04N 1/0005* (2013.01); *H04N 1/00042* (2013.01); *H04N 1/00063* (2013.01); *H04N 1/00074* (2013.01); *H04N 1/00718* (2013.01); *H04N 1/00737* (2013.01); *H04N 1/00745* (2013.01); *H04N 1/00774* (2013.01); *H04N 2201/0082* (2013.01)

(58) Field of Classification Search
None
See application file for complete search history.

(56) References Cited

U.S. PATENT DOCUMENTS

| 6,106,094 A * | 8/2000 | Otani et al. ................. 347/19 |
| 2004/0165209 A1* | 8/2004 | Aoki ................ G03G 15/5012 358/1.14 |
| 2005/0117918 A1* | 6/2005 | Kimura ............... G03G 15/553 399/8 |
| 2011/0149331 A1* | 6/2011 | Duggan ................ G06K 9/036 358/1.14 |

FOREIGN PATENT DOCUMENTS

| JP | 2005205797 A | * | 8/2005 |
| JP | 2010-42601 A | | 2/2010 |
| JP | 2010042601 A | * | 2/2010 |

* cited by examiner

*Primary Examiner* — Huo Long Chen
(74) *Attorney, Agent, or Firm* — Canon USA, Inc. I.P. Division

(57) ABSTRACT

An inspection apparatus which inspects an image determines a type of a printing error based on characteristics of a place where the printing error has occurred, and controls a printing apparatus according to the determined type of printing error.

12 Claims, 21 Drawing Sheets

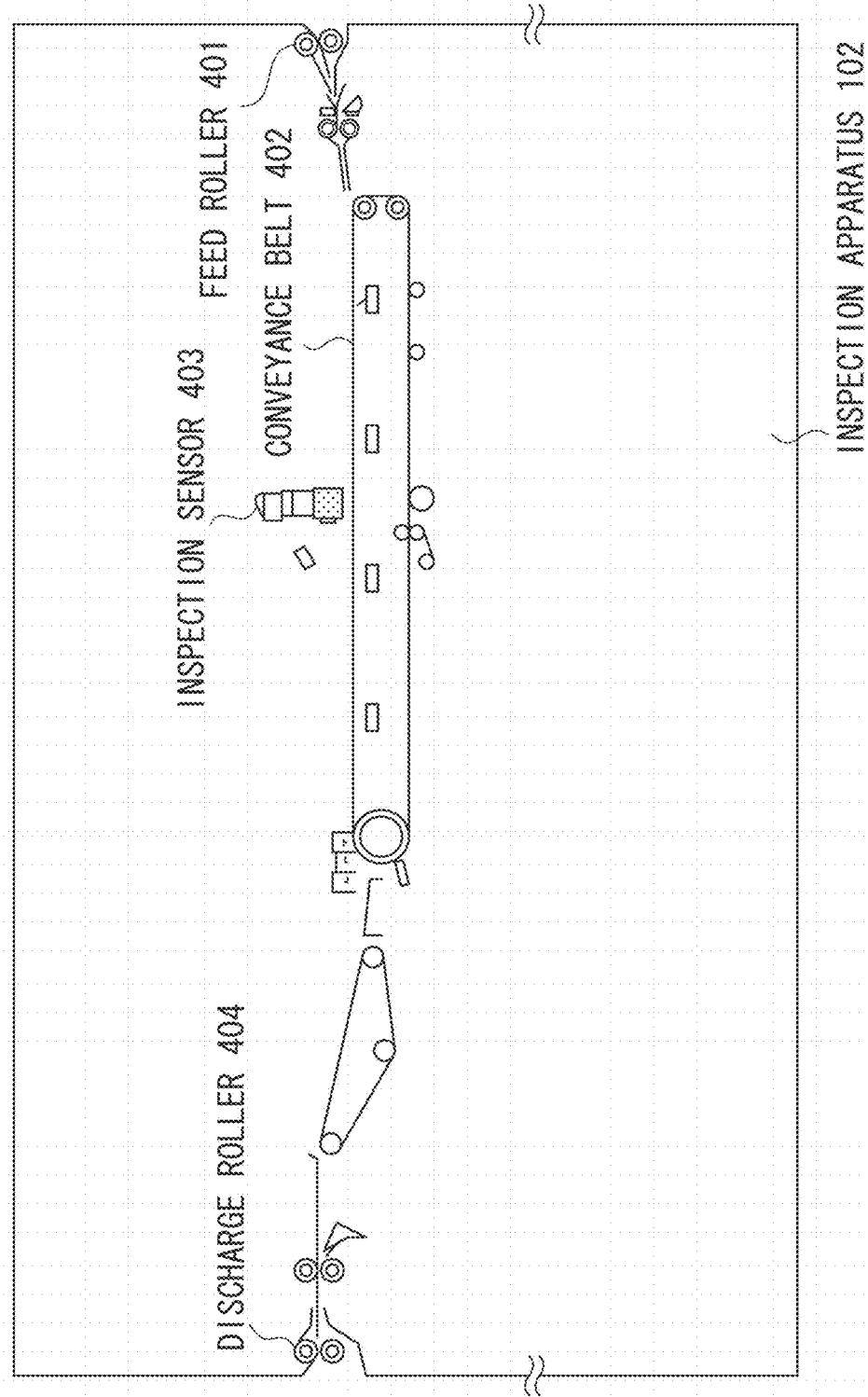

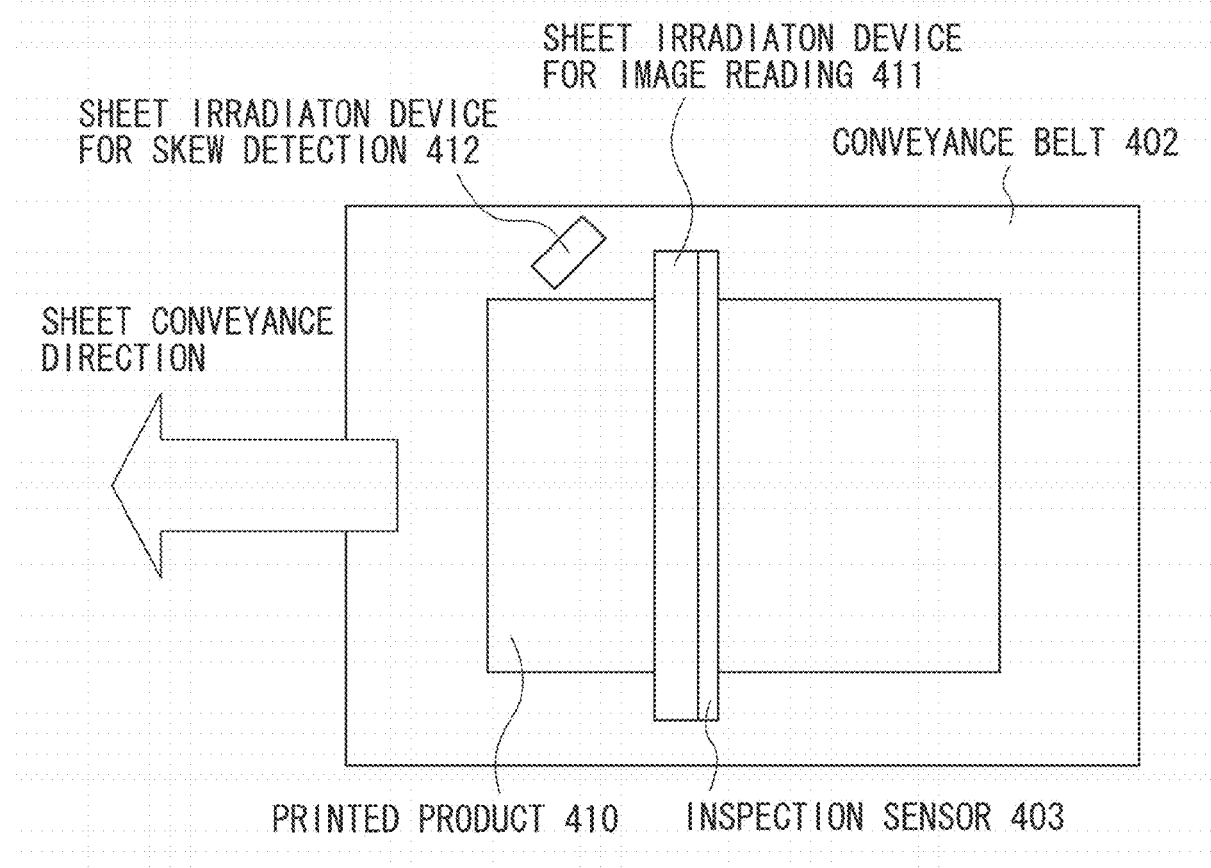

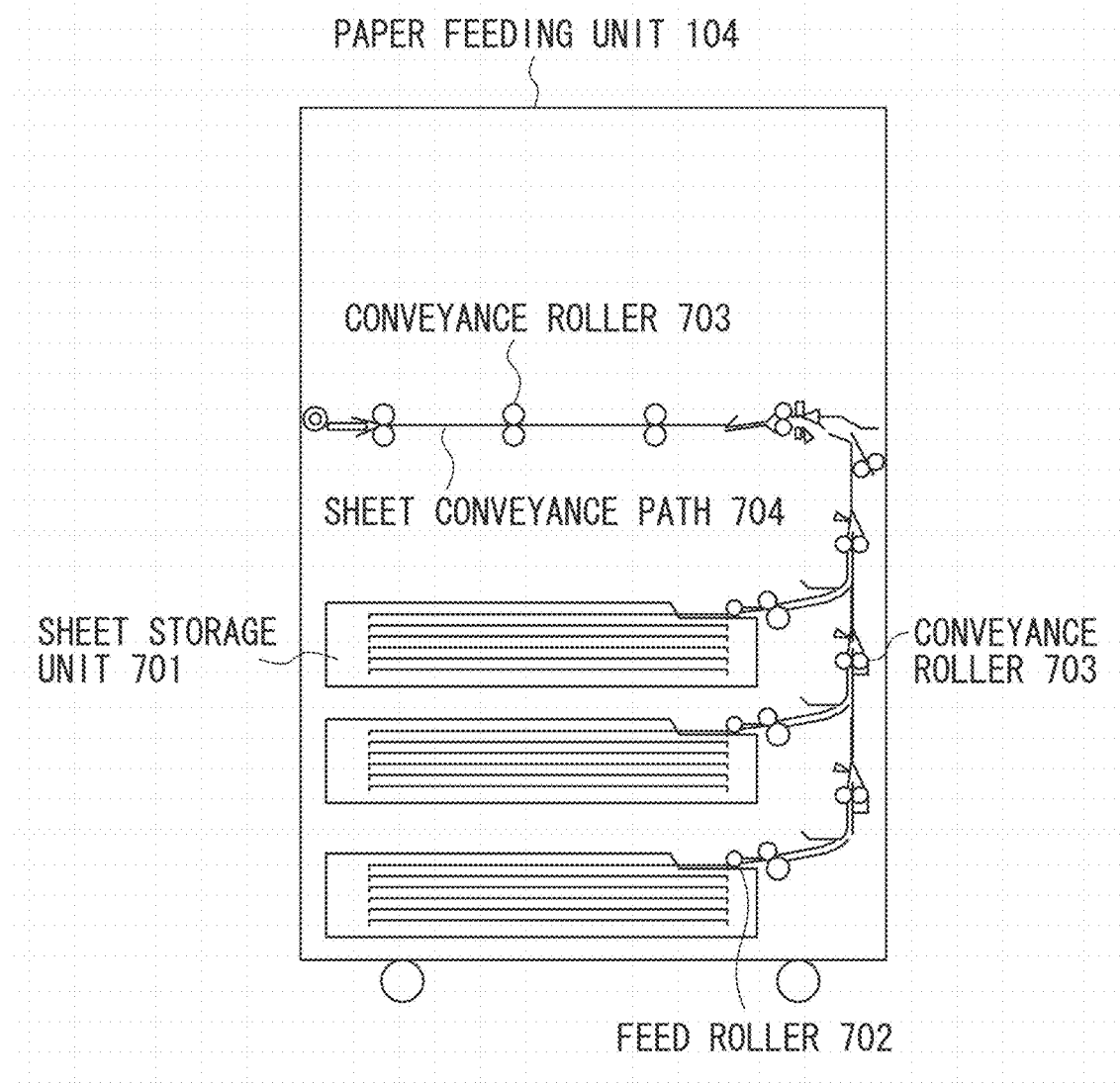

READ IMAGE DATA

IMAGE DIVIDED INTO
5 PIXELS BY 5 PIXELS

REFERENCE IMAGE

READ IMAGE TO BE COMPARED

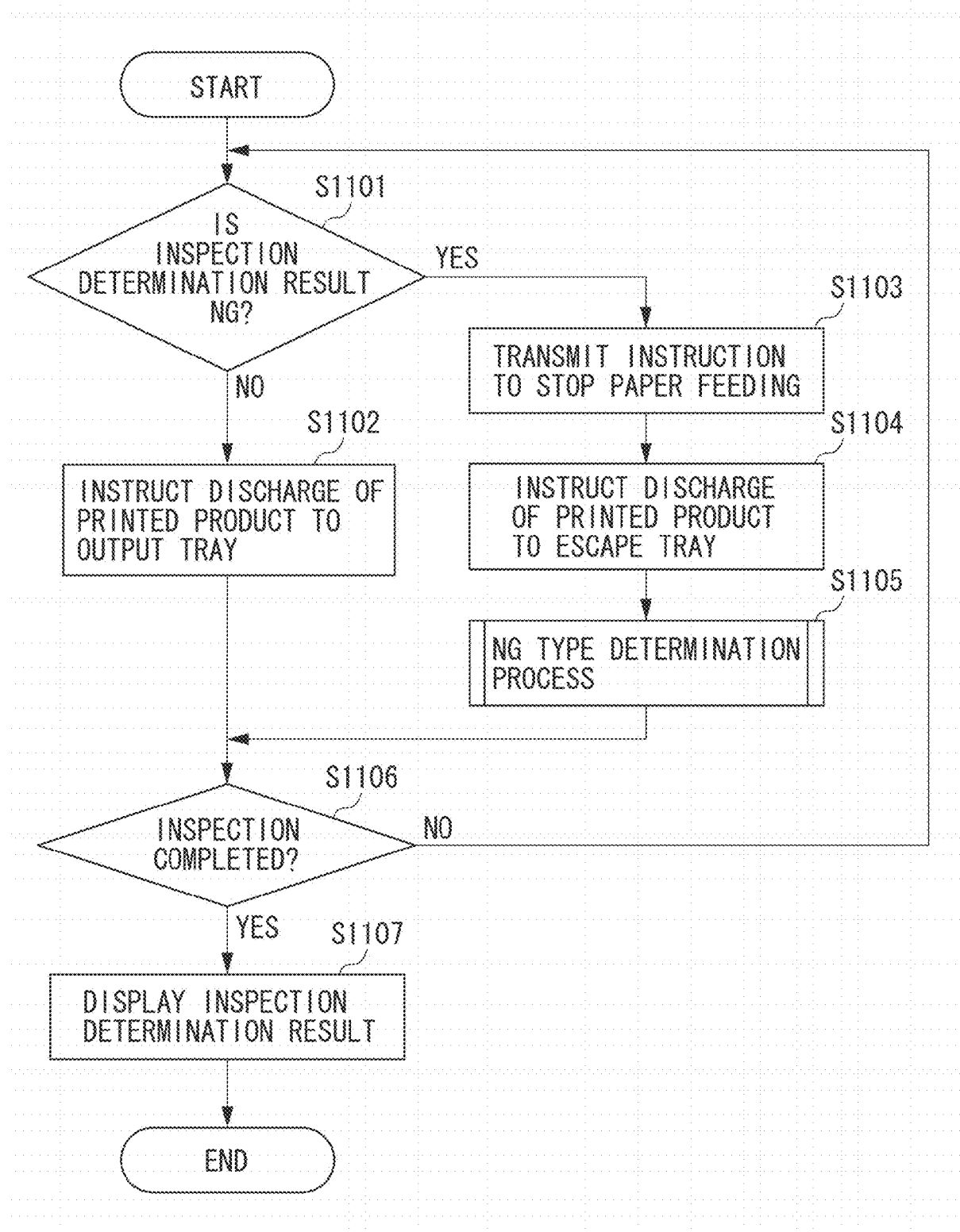

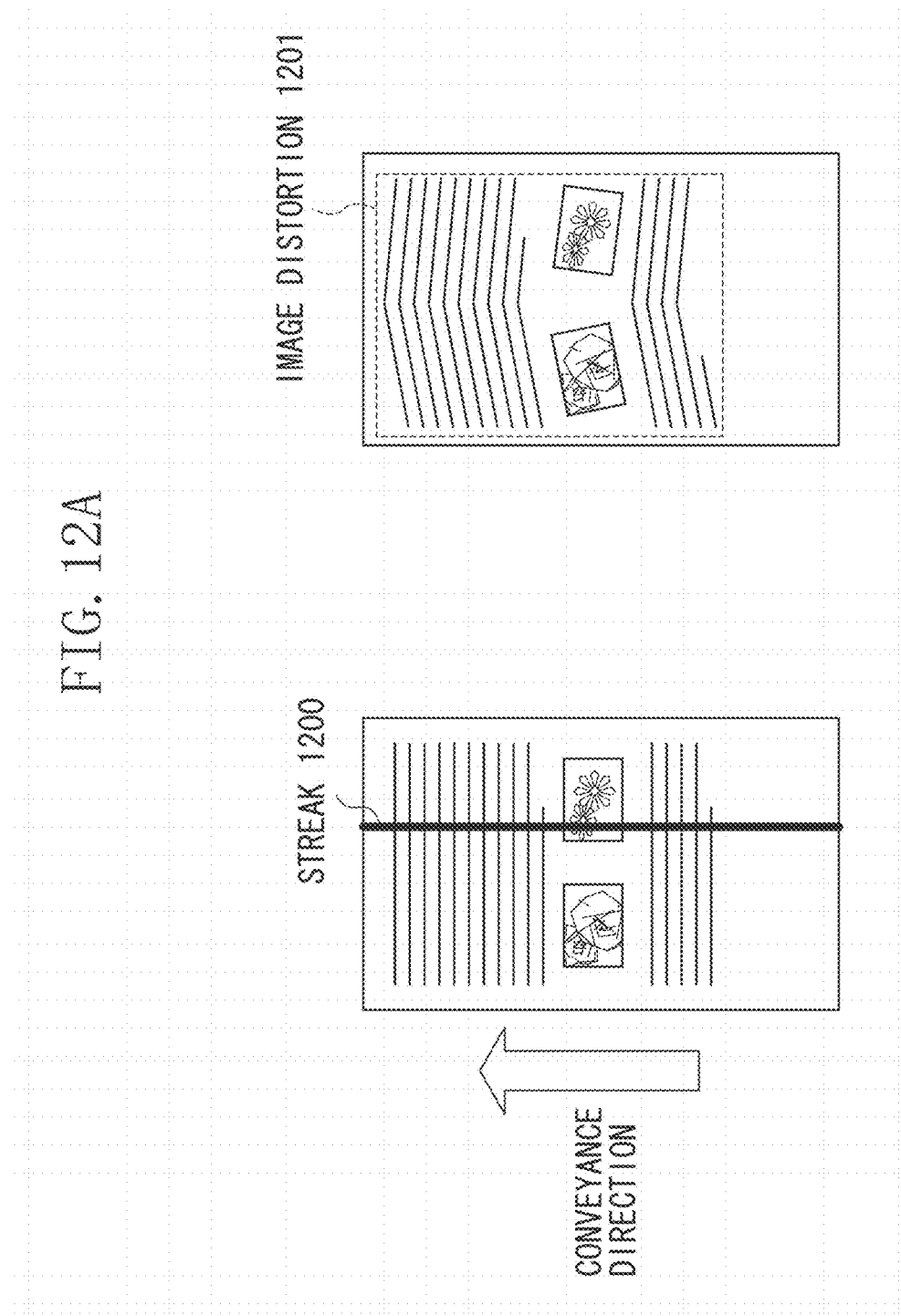

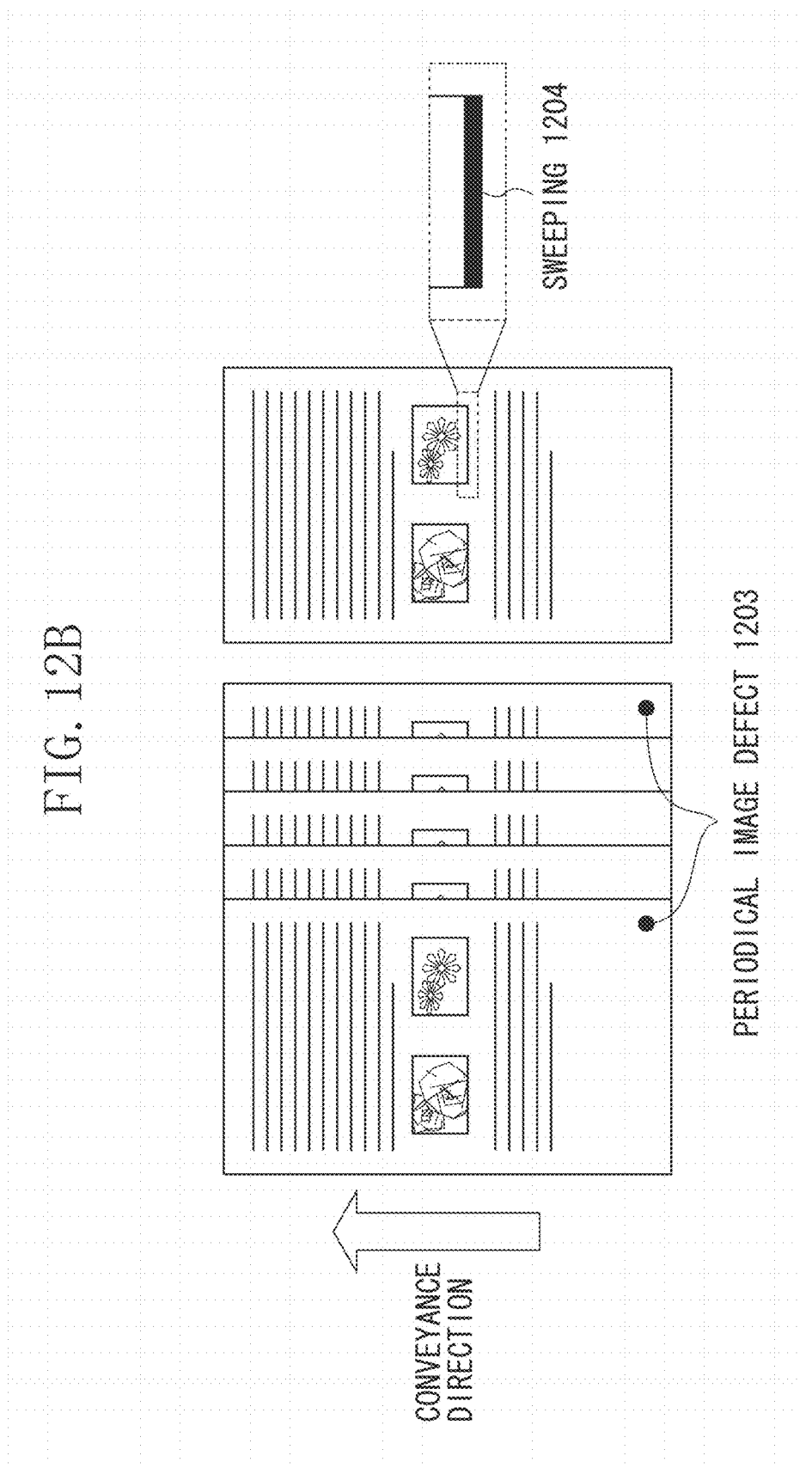

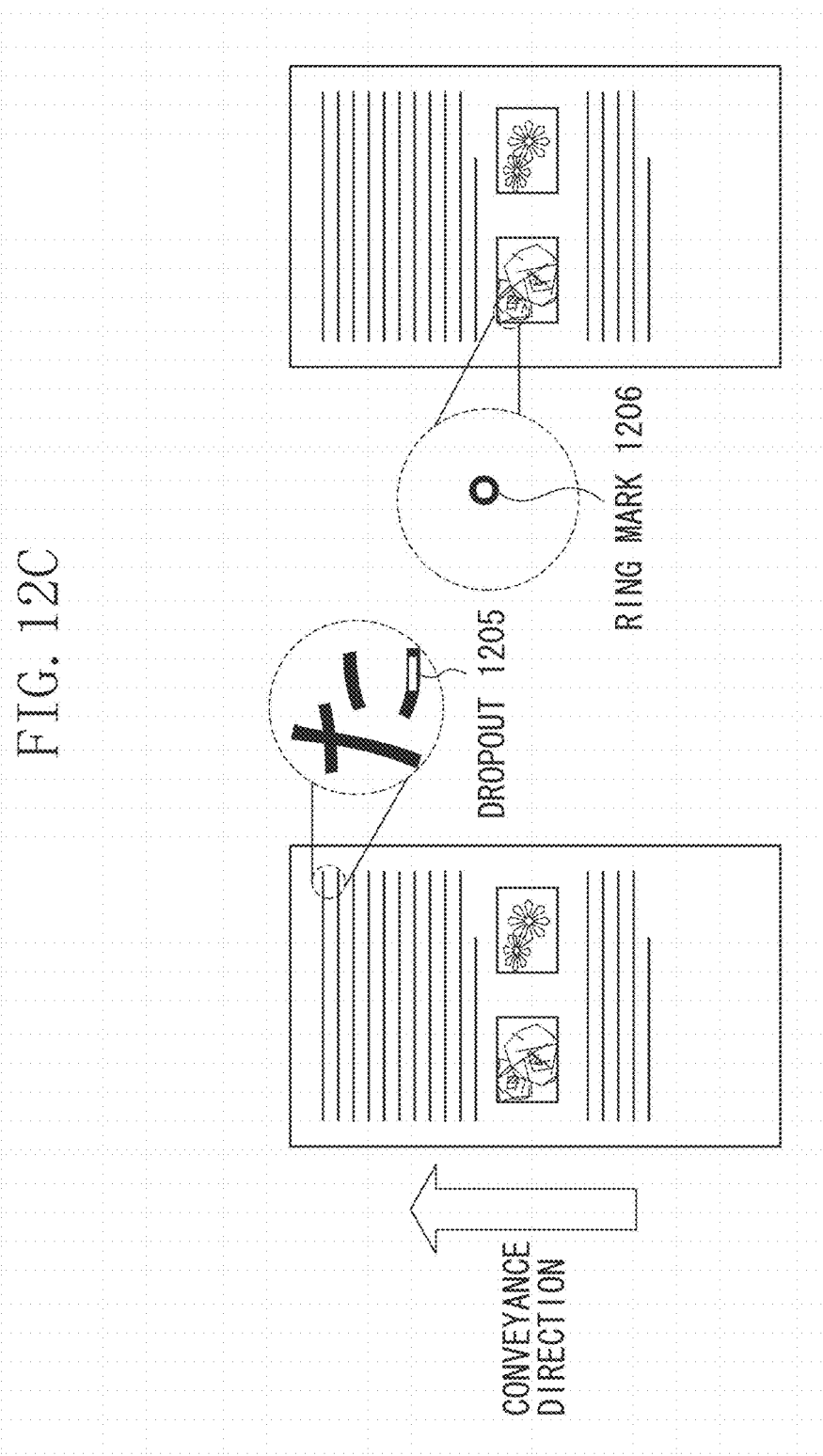

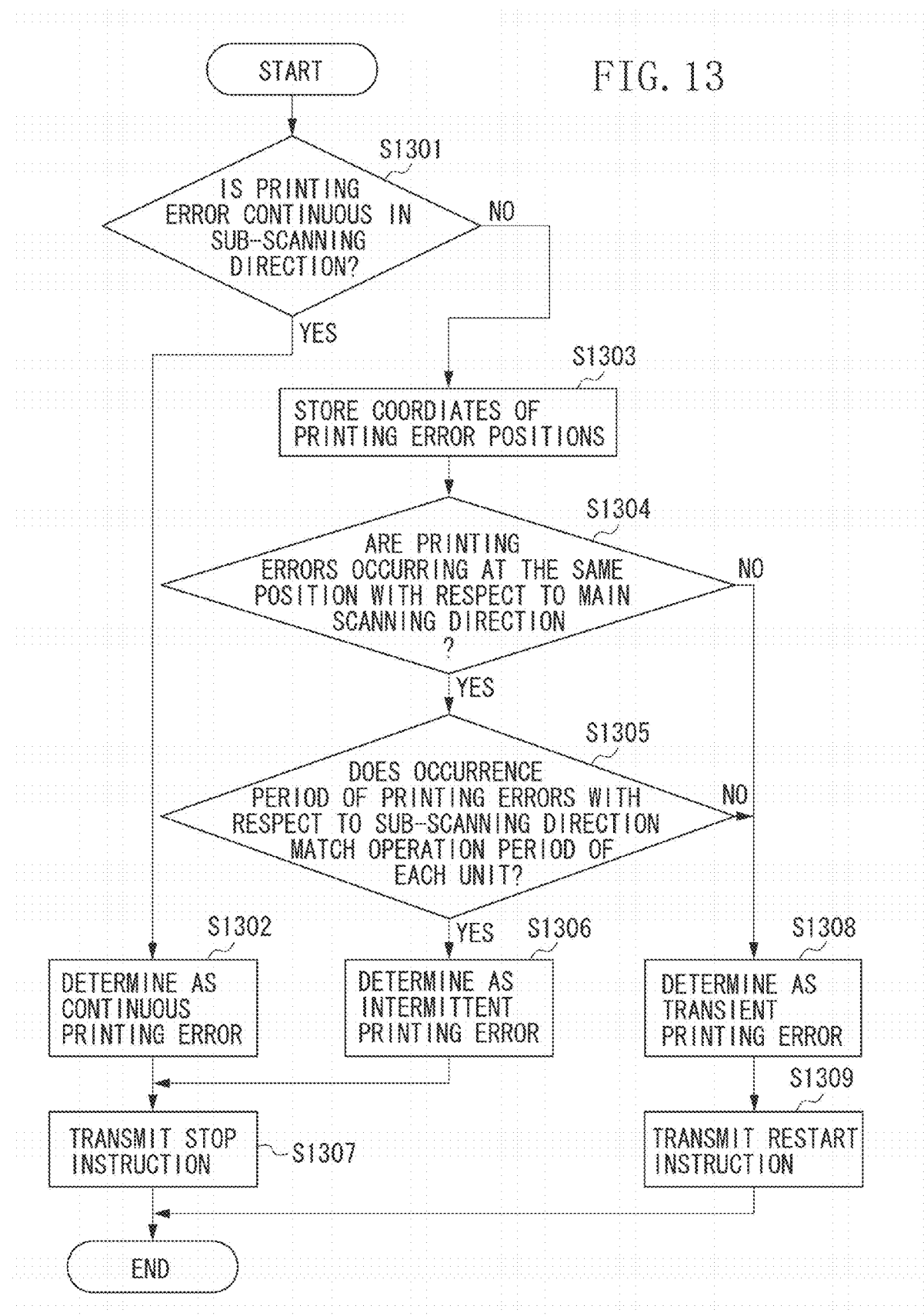

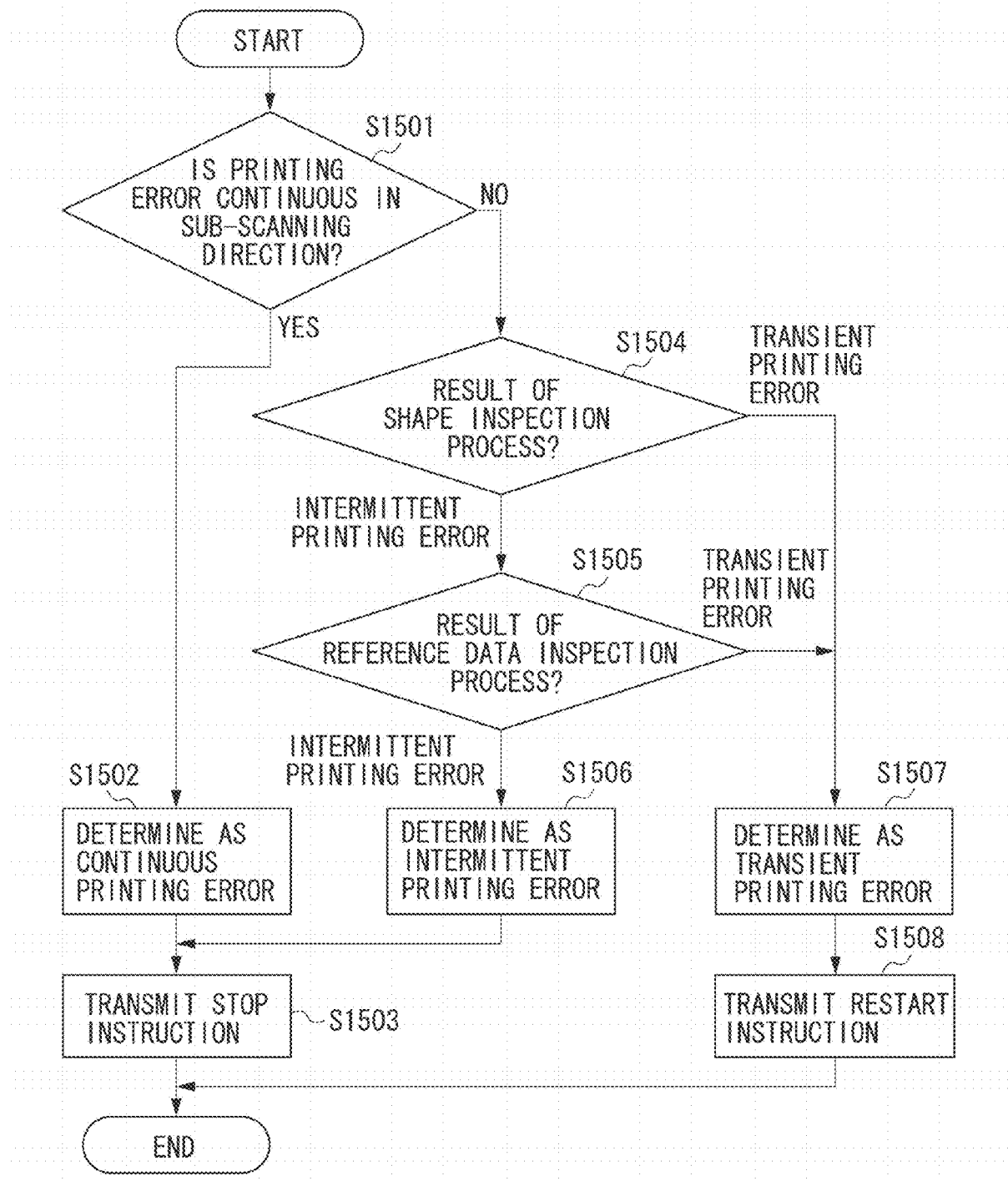

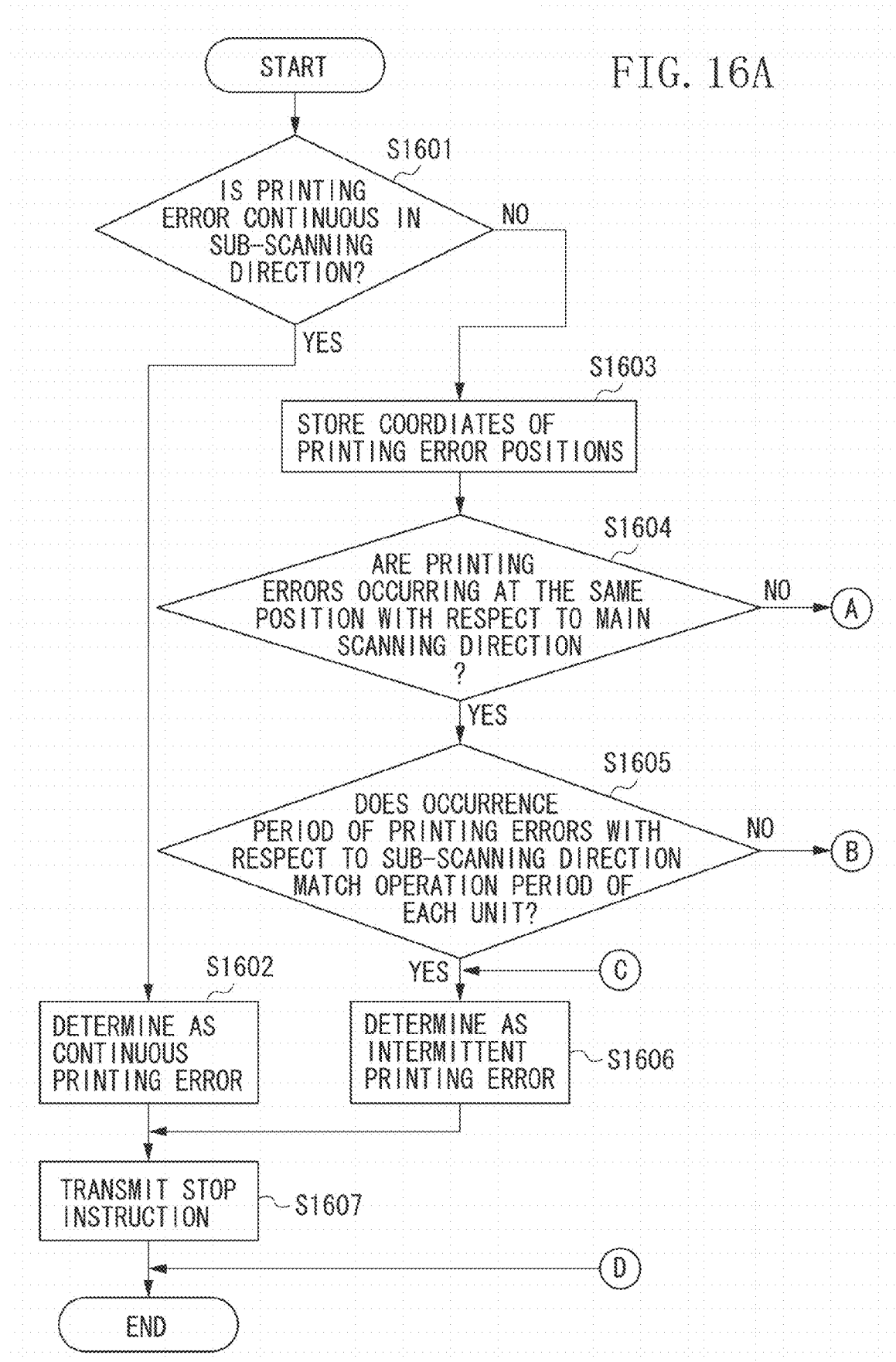

INSPECTION APPARATUS, INSPECTION
METHOD, INSPECTION SYSTEM, AND
COMPUTER-READABLE STORAGE
MEDIUM

BACKGROUND OF THE INVENTION

Field of the Invention

The present invention relates to an inspection apparatus for inspecting a printed product printed by a printing apparatus, an inspection method, an inspection system, and a computer-readable storage medium.

Description of the Related Art

Japanese Patent Application Laid-Open No. 2010-42601 discusses a printing apparatus which inspects an image printed on a printed product. If the printing apparatus determines that a printing error has occurred (i.e., printing is no-good (NG)) in the printed product, the printing apparatus stops feeding sheets and prints on previously-fed sheets (referred to as residual sheets). The printing apparatus inspects the printed residual sheets. If the number of residual sheets determined to include printing errors is greater than a predetermined number of sheets, or a percentage of errors is greater than a reference value, the printing apparatus determines that the printing error continuously occurs and thus stops printing. If the printing apparatus determines that the printing error does not continuously occur, the printing apparatus determines that the printing error occurs transiently. The printing apparatus then restarts feeding of the sheets and continues printing.

There are printing errors that occur intermittently (e.g., at intervals of several sheets) due to a defect in the printing apparatus. Japanese Patent Application Laid-Open No. 2010-42601 discusses a printing apparatus which determines the residual sheets having the printing errors, and then determines a type of printing error based on the number or the percentage of the residual sheets determined to have the printing error. In other words, the printing apparatus determines that the printing error is occurring in units of sheets, and then determines the type of printing error. However, the printing apparatus does not determine the type of the printing error by considering characteristics of each printing error occurring in the sheet.

As a result, if the printing error occurs intermittently, the number of residual sheets determined to have the printing errors may become less than or equal to the reference value depending on an occurrence frequency of the printing error. The printing apparatus may thus determine the printing error which continuously occurs, as a printing error which occurs transiently, and continue printing, so that printed products having the printing errors are mass-produced, and a great amount of sheets is printed wastefully.

SUMMARY OF THE INVENTION

According to an aspect of the present invention, an inspection apparatus which connects to a printing apparatus and inspects a sheet which has been printed by the printing apparatus based on a reference image, includes a receiving unit configured to receive the reference image, a reading unit configured to read the sheet which has been printed and acquire a read image, a determination unit configured to determine, based on characteristics of a place where a printing error has occurred acquired by comparing the reference image and the read image, a type of the printing error, and a control unit configured to control printing performed by the printing apparatus based on the type of the printing error determined by the determination unit.

According to the present invention, the type of the printing error is determined based on the characteristics of the place where the printing error has occurred, and printing is controlled according to the type of the printing error. The number of wasted sheets due to the printing error can thus be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate configurations of an inspection apparatus.

FIG. 7 illustrates a configuration of the paper feeding unit.

FIG. 11 is a flowchart illustrating a control process performed by the inspection apparatus.

FIGS. 12A, 12B, and 12 C illustrate the printing errors.

FIG. 13 is a flowchart illustrating a method for determining the type of printing error according to a first exemplary embodiment of the present invention.

FIG. 15 is a flowchart illustrating a method for determining the type of printing error according to a second exemplary embodiment of the present invention.

FIGS. 16A and 16B are flowcharts illustrating a method for determining the type of printing error according to a third exemplary embodiment of the present invention.

DESCRIPTION OF THE EMBODIMENTS

Various exemplary embodiments, features, and aspects of the invention will be described in detail below with reference to the drawings.

The first exemplary embodiment according to the present invention will be described below with reference to the drawings.

Figure 1:
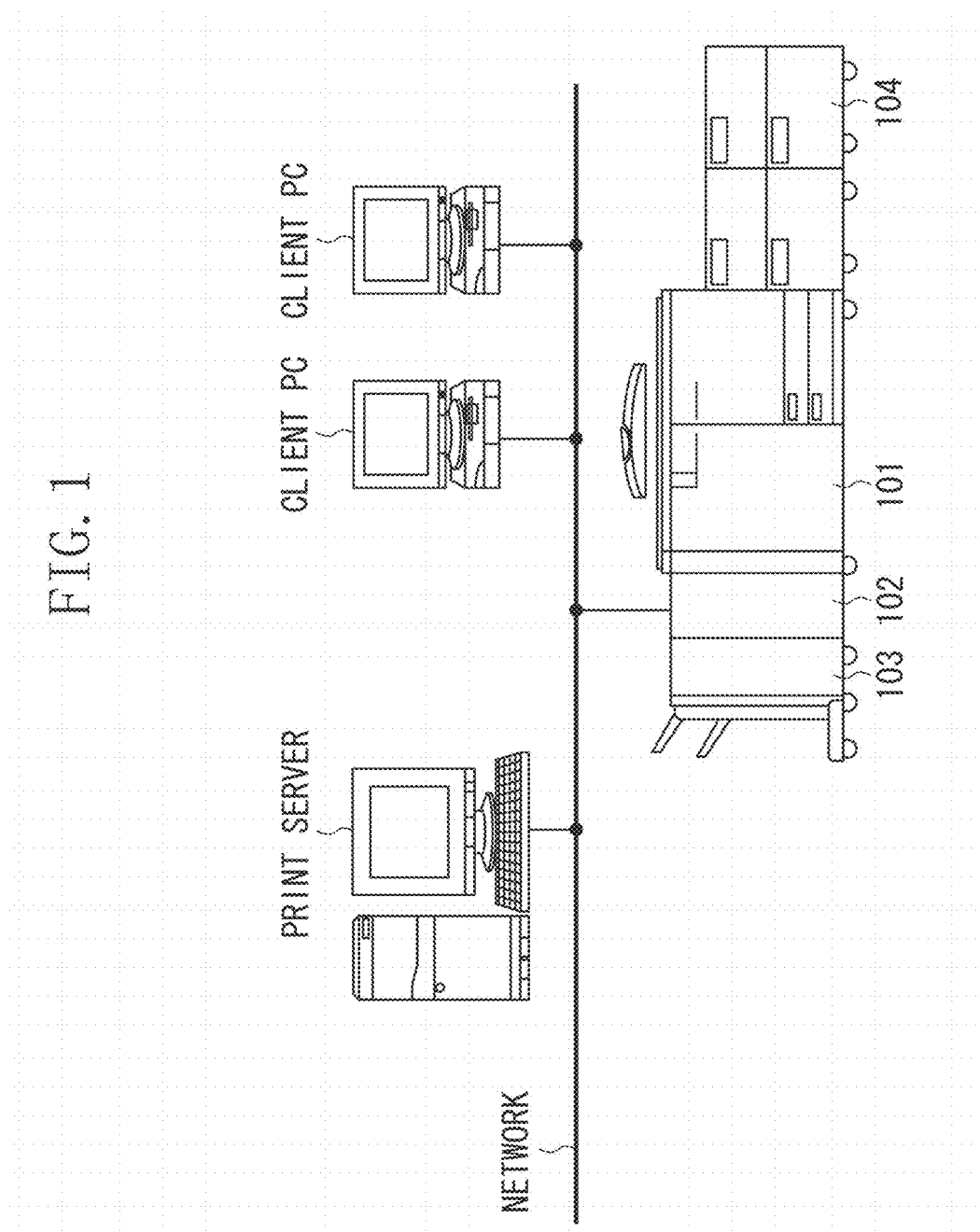
FIG. 1 illustrates a system configuration.

FIG. 1 illustrates an example of the system configuration of an inspection system including the inspection apparatus according to an exemplary embodiment of the present invention.

Referring to FIG. 1, an image forming apparatus (i.e., a printing apparatus) 101 performs, based on input image data (i.e., a reference image), an image forming process on a sheet, i.e., a recording medium, and outputs the printed product. There are various types of sheets, e.g., plain paper, recycled paper, cardboard, and overhead projector (OHP) sheet, which will be collectively referred to as a printing sheet or a sheet.

An inspection apparatus 102 receives the printed product (i.e., the sheet which has been printed) output from the image forming apparatus 101 and inspects the printed product. An inspection process will be described below with reference to FIG. 11.

A finisher (i.e., a post-processing apparatus) 103 receives the printed product inspected by the inspection apparatus 102 and performs post-processing such as binding the sheets by stapling. Further, the finisher 103 discharges the printed products such that a user can distinguish the result of inspection of the printed product performed by the inspection apparatus 102.

A paper feeding unit (i.e., a paper feeding apparatus) 104 feeds the sheets to the image forming apparatus 101, and the image forming apparatus 101 prints an image on the fed sheets.

The image forming apparatus 101 is connected to an external printer server and client personal computers (PC) via a network. Further, according to the present exemplary embodiment, the image forming apparatus 101, the inspection apparatus 102, and the finisher 103 are connected to one other via a communication cable. Furthermore, the image forming apparatus 101 and the paper feeding unit 104 are connected to one another. An in-line inspection system in which the image forming apparatus 101, the inspection apparatus 102, the finisher 103, and the paper feeding unit 104 serially perform printing, inspection, and finishing will be described below.

<The Configuration of the Image Forming Apparatus>

Figure 2:
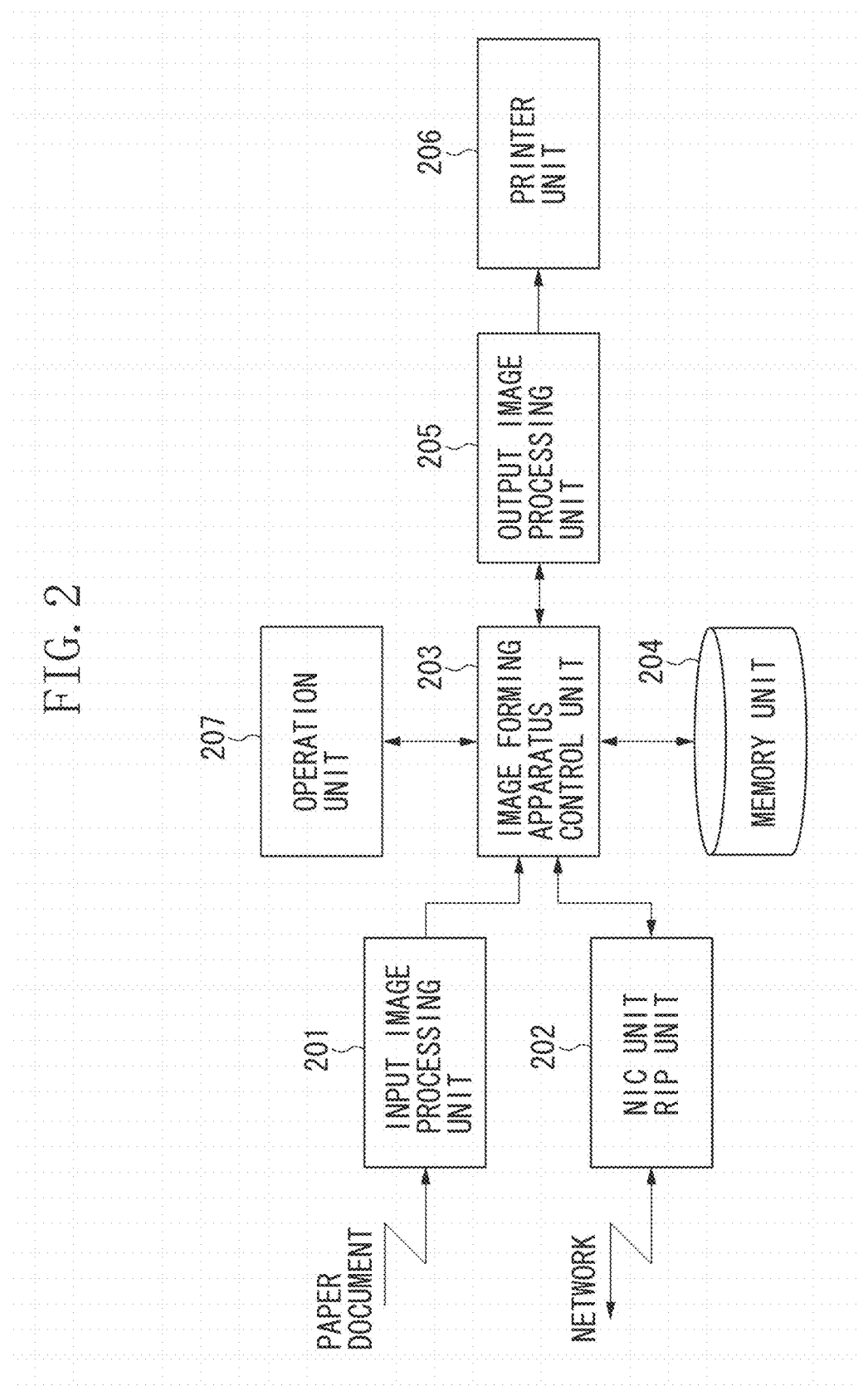
FIG. 2 is a block diagram illustrating a control unit in an image forming apparatus.

FIG. 2 is a block diagram illustrating the control unit in the image forming apparatus 101. The control unit collectively controls the image forming apparatus 101.

Referring to FIG. 2, an input image processing unit 201 reads a new document using an image reading device such as a scanner, and performs image processing on the read image data.

A network interface card (NIC) unit 202 transfers to a raster image processing (RIP) unit the image data input from the network, and transmits to external devices via the network the image data and apparatus information of the image forming apparatus 101. The RIP unit decodes input page description language (PDL) data and rasterizes the data into raster image data (i.e., bitmap data).

An image forming apparatus control unit 203 controls input and output of data, and a paper feeding operation. For example, the image forming apparatus control unit 203 stores the image data in a memory unit 204 and calls it from the memory unit 204, and stops and restarts the paper feeding operation of the paper feeding unit 104. Further, the image forming apparatus control unit 203 transmits to an output image processing unit 205 the bitmap data rasterized by the RIP unit. Furthermore, according to the present exemplary embodiment, the image forming apparatus control unit 203, the inspection apparatus 102, the finisher 103, and the paper feeding unit 104 communicate with one another, and transmit to and receive from one another necessary information.

An output image processing unit 205 performs on the bitmap image data transmitted from the image forming apparatus control unit 203, image processing for performing printing, and transmits the processed image data to a printer unit 206. Further, the output image processing unit 205 transmits the processed image data as reference data to the inspection apparatus 102. The output image processing unit 205 thus functions as an image transmission unit.

The printer unit 206 prints on the sequentially fed sheets, based on the image data processed by the output image processing unit 205, and outputs the printed product.

An operation unit 207 is a user interface for a user to make finishing settings with respect to the output printed product and inspection settings with respect to the inspection apparatus 102. Further, the operation unit 207 also functions as a display unit which displays statuses of each of the apparatuses, such as the image forming apparatus 101 and the inspection apparatus 102.

Figure 3:
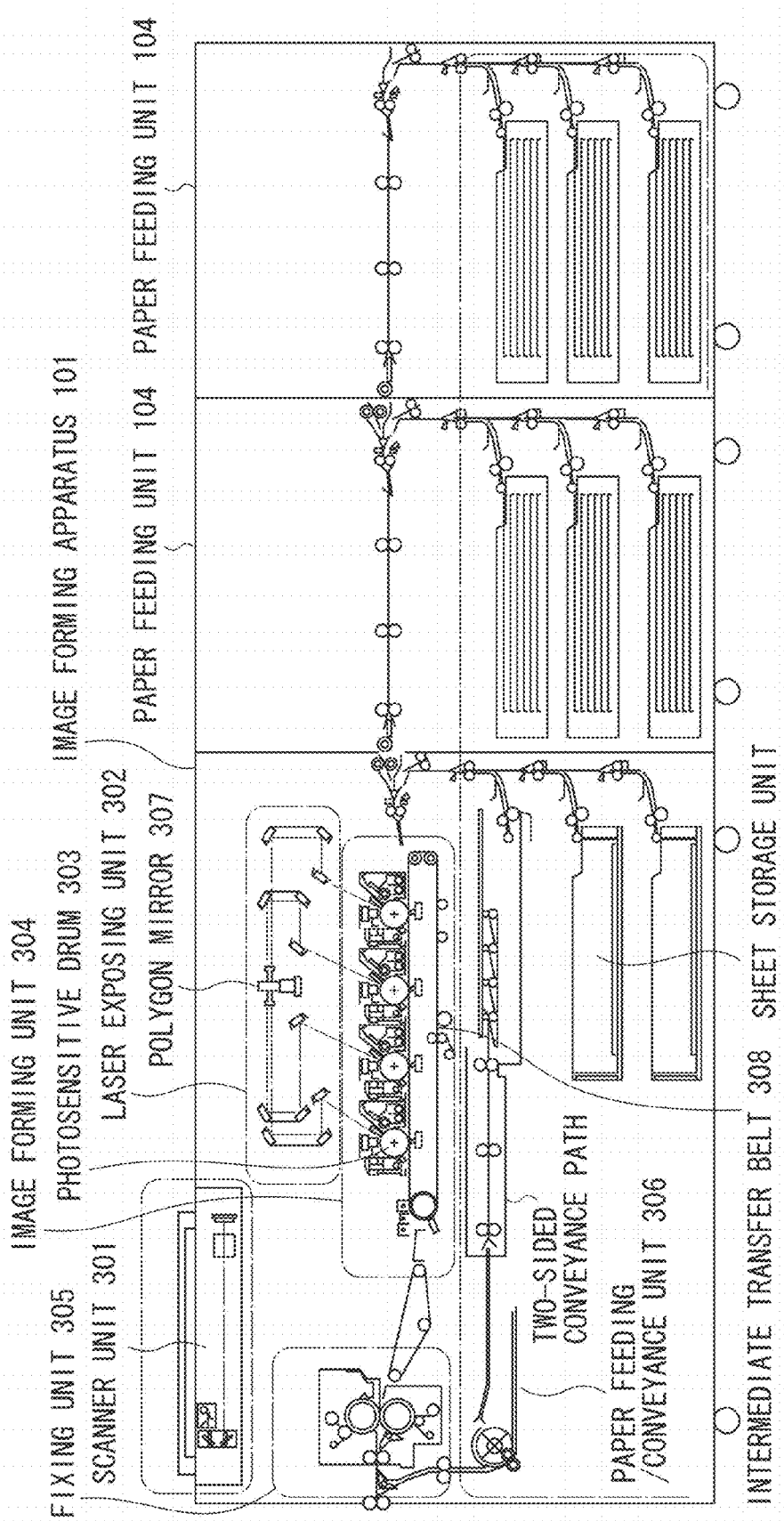
FIG. 3 illustrates a configuration of the image forming apparatus.

FIG. 3 illustrates the configuration of the image forming apparatus 101 and the paper feeding unit 104.

Referring to FIG. 3, the image forming apparatus 101 includes a scanner unit 301, a laser exposing unit 302, a photosensitive drum 303, an image forming unit 304, a fixing unit 305, and a paper feeding/conveyance unit 306. The paper feeding unit 104 includes a plurality of sheet storage units. Further, the image forming apparatus includes the control unit (not illustrated) illustrated in FIG. 2 which collectively controls the image forming apparatus 101 and the paper feeding unit 104 illustrated in FIG. 3.

The scanner unit 301 illuminates a document placed on a document stage and optically reads a document image. The scanner unit 301 then converts the read document image to an electrical signal and generates the image data.

The laser exposing unit 302 inputs to a rotating polygon mirror 307 that rotates at a constant angular speed, a light beam such as a laser beam modulated according to the image data. The laser exposing unit 302 thus irradiates the photosensitive drum 303 with reflected scanning light.

The image forming unit 304 rotatably drives and charges using a charging device the photosensitive drum 303. The image forming unit 304 then develops using toner a latent image formed by the laser exposing unit 302 on the photosensitive drum 303. The image forming unit 304 then transfers via an intermediate transfer belt 308 the toner image to a sheet, and collects minute toner remaining on the photosensitive drum 303 without being transferred. The image forming unit 304 is realized by including four developing units (i.e., developing stations) which perform the above-described series of electrophotographic process.

The four developing units are arranged in an order of yellow (Y), magenta (M), cyan (C), and black (B) developing units. The developing units sequentially execute magenta, cyan, and black image forming operations after a predetermined time has elapsed from when the cyan developing unit has started the image forming operation. The image forming unit 304 thus transfers the toner image of each color to the sheet by performing such timing control. According to the present exemplary embodiment, a color printer is described as an example of the image forming apparatus. However, the image forming apparatus is not limited to the color printer. For example, only the black developing unit is provided in the case of a monochrome printer.

The fixing unit 305 is configured by a combination of rollers and belts, and also includes a heat source such as a halogen heater. The fixing unit 305 thus melts and fixes by heat and pressing force the toner on the sheet on which the image forming unit 304 has transferred the toner image.

The paper feeding/conveyance unit 306 separates one sheet from a plurality of sheets stored in the sheet storage unit included in the image forming apparatus 101 or the paper feeding unit 104, according to an instruction from the control unit. The paper feeding/conveyance unit 306 then conveys the sheet to the image forming unit 304 and the fixing unit 305. The developing units then transfer the toner images of each color on the conveyed sheet, and a full-color image is formed on the sheet. Further, if the image forming apparatus 101 is to perform two-sided printing, the image forming apparatus 101 performs control so that the sheet is conveyed on a conveyance path to re-convey to the image forming unit 304 the sheet that has passed through the fixing unit 305. The paper feeding/conveyance unit 306 then conveys the printed sheet to the inspection apparatus 102.

<The Configuration of the Finisher>

Figure 5:
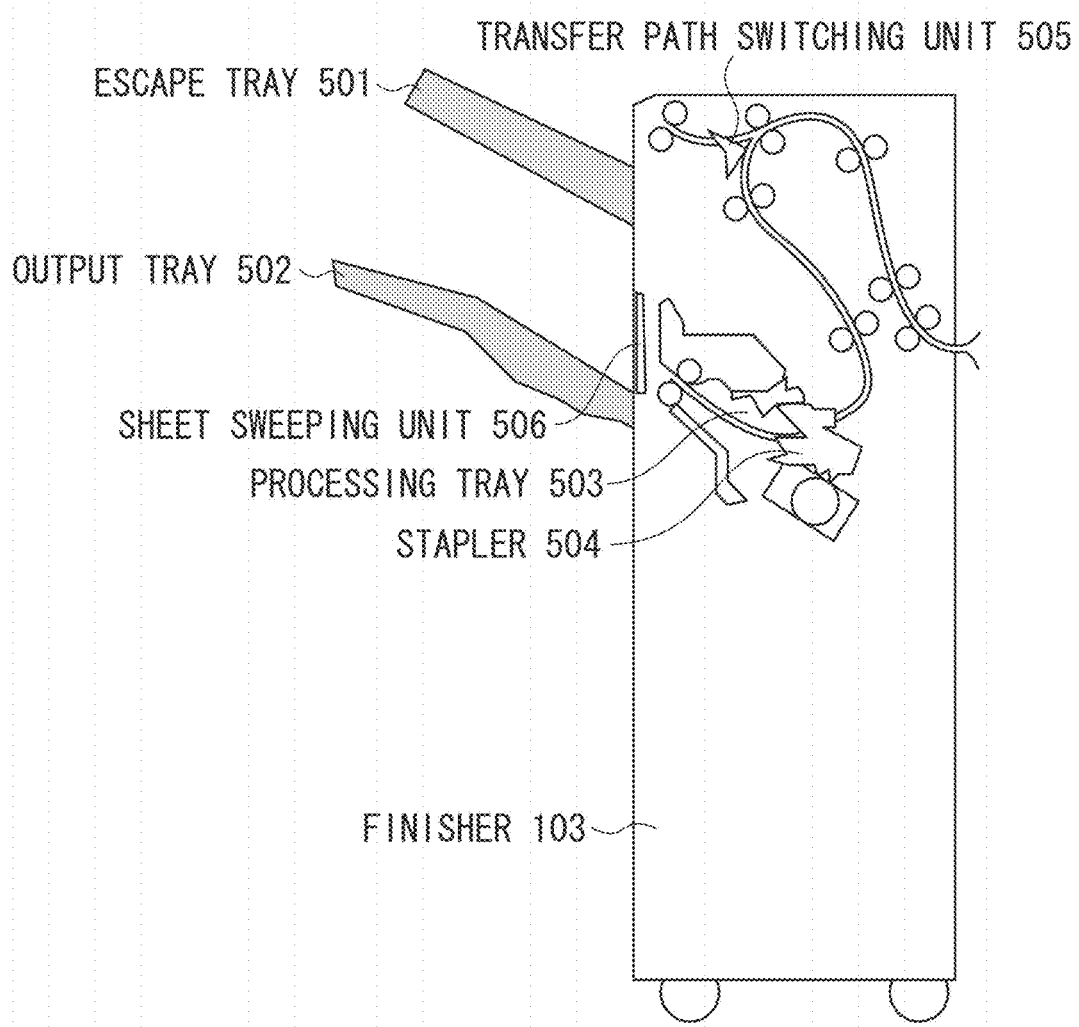
FIG. 5 illustrates a configuration of a finisher.

FIG. 5 illustrates the configuration of the finisher 103.

Referring to FIG. 5, the sheet discharged from the inspection apparatus 102 is input to the finisher 103. The finisher 103 includes an escape tray 501 and an output tray 502 as sheet discharge destinations. The finisher 103 switches the discharge destinations according to the result of inspection performed by the inspection apparatus 102 and discharges the sheets.

Further, if a staple mode is set to a job to be output, a finisher control unit 601 performs control to output the printed product to the output tray 502. In such a case, the sheets for each job are sequentially accumulated on a processing tray 503 in the finisher 103 previous to the sheet being discharged to the output tray 502. A stapler 504 then binds the sheets on the processing tray 503 and discharges the recording sheet bundle to the output tray 502.

A transfer path switching unit 505 switches a transfer path of the printed product according to determination information output from the inspection apparatus 102. As a result, the printed product can be distinguished and transferred to the escape tray 501 or the output tray 502.

Figure 6A:
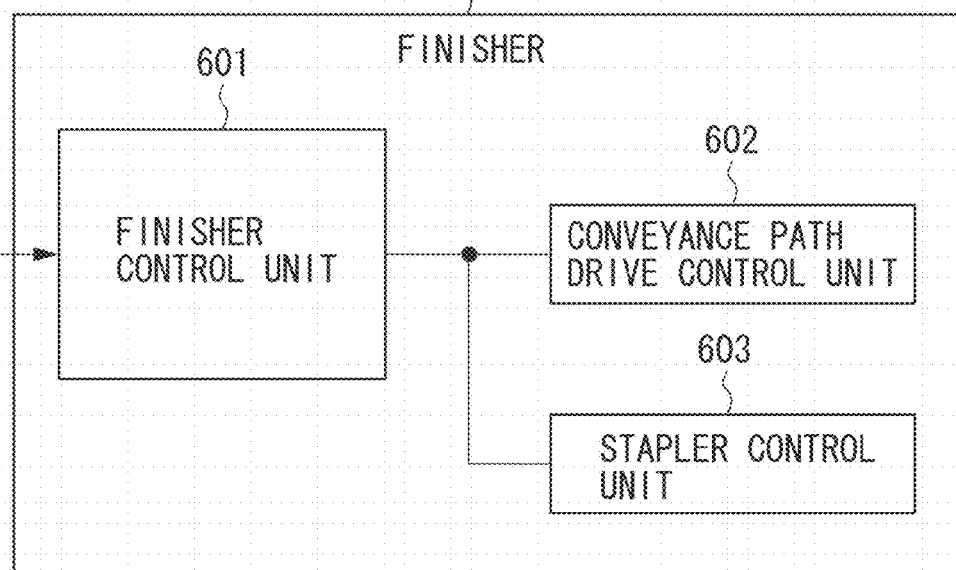
FIGS. 6A and 6B are block diagrams illustrating the control units in the finisher and a paper feeding unit.

FIG. 6A is a block diagram illustrating the control unit in the finisher 103. The control unit controls each of the operations of the finisher 103.

Referring to FIG. 6A, a finisher control unit 601 communicates with a conveyance path drive control unit 602 and a stapler control unit 603. Further, the finisher control unit 601, the image forming apparatus 101, and the inspection apparatus 102 are connected to each other, and configured to transmit and receive the necessary data between one another. For example, the finisher control unit 601 receives from the image forming apparatus 101 finisher setting information according to a job, and communicates with each control unit in the finisher 103 based on the received setting information.

The conveyance path drive control unit 602 guides the sheet to the various finishing units based on the control information of the job transmitted from the finisher control unit 601. For example, if the user desires to perform stapling, the conveyance path drive control unit 602 communicates with the stapler control unit 603, and the finisher control unit 601 receives the status information of the stapler control unit 603. The finisher control unit 601 then transmits the control information of the job, so that the finisher 103 performs the stapler operation according to the content of the job and outputs the result.

<The Configuration of the Paper Feeding Unit>

FIG. 7 illustrates the configuration of the paper feeding unit 104.

The paper feeding unit 104 feeds the sheets to the image forming apparatus 101. Referring to FIG. 7, the paper feeding unit 104 includes a sheet storage unit 701, a feed roller 702, a conveyance roller 703, and a sheet conveyance path 704. The paper feeding unit 104 starts feeding the sheets by receiving an instruction from the image forming apparatus control unit 203. The paper feeding unit 104 then starts driving the feed roller 702, and conveys the sheet from the sheet storage unit 701 to the conveyance roller 703. The paper feeding unit 104 drives the conveyance roller 703 and conveys the sheet to the sheet conveyance path 704, and thus feeds the sheet to the image forming apparatus 101.

Further, the paper feeding unit 104 stops driving the feed roller 702 while continuing to drive the conveyance roller 703 according to the result of the inspection apparatus 102. The paper feeding unit 104 performs such control so that the sheet which the feed roller 702 has started feeding (i.e., the residual sheet) can be used in performing inspection.

Figure 6B:
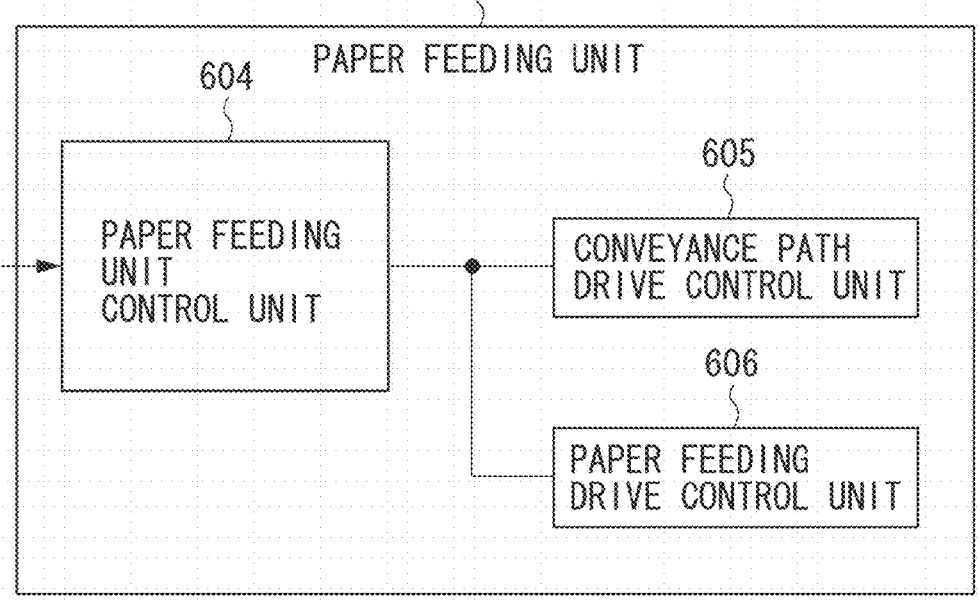

FIG. 6B is a block diagram illustrating the control unit in the paper feeding unit 104. The control unit controls the various operations of the paper feeding unit 104.

Referring to FIG. 6B, a paper feeding unit control unit 604 communicates with a conveyance path drive control unit 605 and a paper feeding drive control unit 606. Further, the paper feeding unit control unit 604 and the image forming apparatus 101 are connect to each other, and transmit and receive the necessary data between one another. For example, the paper feeding unit control unit 604 receives a paper feed instruction from the image forming apparatus 101 and communicates with each control unit in the paper feeding unit 104 based on the received paper feed instruction.

The conveyance path control unit 605 drives the conveyance roller 703 and conveys to the image forming apparatus 101 the sheet, based on the paper feed instruction received from the paper feeding unit control unit 604.

The paper feeding drive control unit 606 drives the feed roller 702 for feeding the sheets from the sheet storage unit 701, based on the paper feed instruction received from the paper feeding unit control unit 604. The paper feeding drive control unit 606 thus conveys the sheets to the sheet conveyance path 704.

For example, in normal print control, the paper feeding drive control unit 606 drives the feed roller 702 and the conveyance roller 703 and sequentially feeds the sheets to the image forming apparatus 101 according to the instruction from the image forming apparatus 101. Further, the paper feeding drive control unit 606 can switch control according to the result of the inspection process performed by the inspection apparatus 102. For example, the paper feeding unit control unit 604 receives via the image forming apparatus 101 the result of the inspection process performed by the inspection apparatus 102. The paper feeding unit control unit 604 then stops driving the feed roller 702 and only continues to drive the conveyance roller 703 depending on the result. Further, the paper feeding unit control unit 604 may stop both the feed roller 702 and the conveyance roller 703 depending on the result of the inspection process performed by the inspection apparatus 102.

<The Configuration of the Inspection Apparatus>

FIG. 4A illustrates the configuration of the inspection apparatus 102. Referring to FIG. 4A, a feed roller 401 draws into the inspection apparatus 102 the sheet which has been printed by and output from the image forming apparatus 101. A conveyance belt 402 then conveys the printed product, and an inspection sensor 403 positioned above the conveyance belt 402 reads and inspects the printed product. The inspection sensor 403 transmits the inspection result to the finisher 103. After the inspection apparatus 102 has performed the inspection process, the printed product is conveyed from a discharge roller 404 to the finisher 103. The inspection sensor 403 may be structured to be capable of inspecting a two-sided printed product with an inspection sensor (not illustrated) reading the printed product from below the conveyance belt 402.

FIG. 4B illustrates the conveyance belt 402 viewed from above.

Referring to FIG. 4B, the inspection sensor 403 is a line sensor which reads line by line the image on a printed product 410 conveyed by the conveyance belt 402.

A sheet irradiation device for reading an image 411 irradiates the printed product with light. The inspection sensor 403 thus receives reflected light and reads the printed product.

A sheet irradiation device for skew detection 412 detects whether the printed product placed on the conveyance belt 402 is skewed with respect to a sheet conveyance direction.

Figure 8:
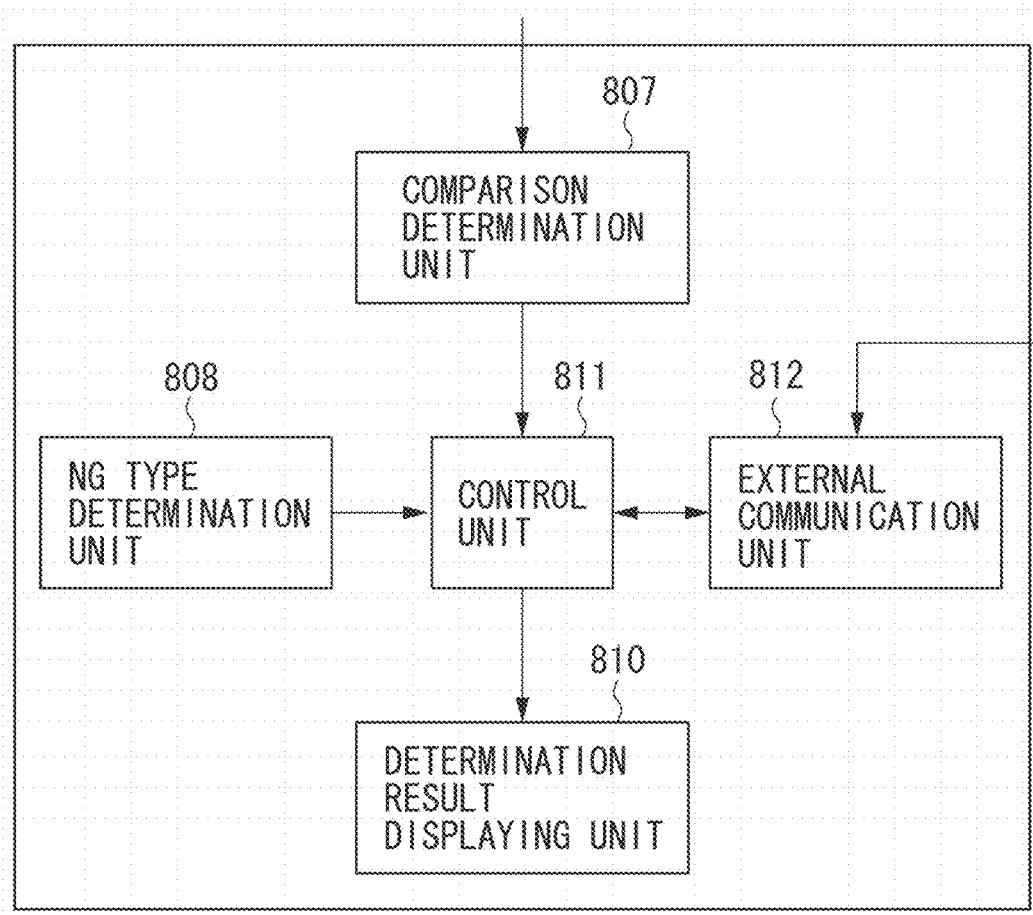
FIG. 8 is a block diagram illustrating a process performed by the inspection apparatus.

FIG. 8 is a block diagram illustrating each processing unit including a control unit 811 in the inspection apparatus 102. The operations of the inspection apparatus 102 are executed by each of the processing units cooperating with one another. Each of the processing units illustrated in FIG. 8 performs each of the processes illustrated in the flowchart of FIG. 11.

FIG. 11 is a flowchart illustrating the inspection process performed by the inspection apparatus 102. Each of the steps in the flowchart will be described below.

In step S1101, the control unit 811 compares the image data (i.e., scanned data) acquired by the inspection sensor 403 reading the printed product, with the reference data transmitted from the image forming apparatus 101. The control unit 811 thus inspects the printed product. The processes performed in step S1101 include pre-comparison processing of the scanned data, and a process for comparing the scanned data and the reference data, which will be described below with reference to FIGS. 9A and 9B, and FIGS. 10A, 10B, 10C, and 10D.

If the inspection result is "OK" (NO in step S1101), the process proceeds to step S1102. In step S1102, the control unit 811 transmits to the finisher control unit 601 the instruction to discharge the printed product to the output tray 502.

If the inspection result is "NG" (YES in step S1101), the process proceeds to step S1103. In step S1103, the control unit 811 transmits to the image forming apparatus control unit 203 via an external communication unit 812 the instruction to stop the paper feeding operation. The instruction to stop the paper feeding operation is a control signal for stopping the feed roller 702 and not stopping the conveyance roller 703. The control signal does not stop the printing process. Upon receiving such a control signal which instructs stopping of the paper feeding operation, the image forming apparatus control unit 203 stops the paper feeding operation to prevent printing to be performed on a new sheet. Further, the control signal allows printing to be performed on the residual sheets which have previously been fed and are being conveyed in the image forming apparatus 101, so that the type of printing error (NG) can be determined based on the printing result. According to the present exemplary embodiment, there is a plurality of residual sheets.

Further, it is not necessary that the image content to be printed on the plurality of residual sheets after the paper feeding operation has been stopped in step S1103 is the image content about which the image defect has been detected in step S1101. If the image content printed on each of the residual sheets is different, the type of the image defect can be detected independent of the specific image content in a NG type determination process to be described below.

In step S1104, the control unit 811 transmits to the finisher control unit 601 an instruction to discharge to the escape tray 501 the residual sheet which has been printed.

In step S1105, a NG type determination unit (i.e. a determination unit) 808 performs the NG type determination process on the printed residual sheet. The NG type determination process will be described in detail below with reference to FIGS. 12A, 12B, 12C, and 13.

In step S1106, the control unit 811 determines whether the printed product to be inspected is the last printed product. For example, if a printed product is not conveyed to the inspection apparatus 102 for a predetermined time interval or longer, the control unit 811 determines that the printed product to be inspected is the last printed product. If the control unit 811 determines that the printed product to be inspected is the last printed product (YES in step S1106), the process proceeds to step S1107. If the control unit 811 determines that the printed product to be inspected is not the last printed product (NO in step S1106), the process returns to step S1101.

In step S1107, a determination result displaying unit (i.e., a display unit) 810 generates display information indicating an inspection determination result and/or the operation status of the image forming apparatus 101 (refer to FIG. 14). The determination result displaying unit 810 then displays the generated display information on a display unit (not illustrated) in the inspection apparatus 102. The display information is the information indicating the result of printing performed in the image forming apparatus 101. The process then ends. The determination result displaying unit 810 may transmit to the image forming apparatus 101 via the external communication unit 812 the display information, and cause the operation unit 207 in the image forming apparatus 101 to display the information.

<Pre-Comparison Preprocessing>

Pre-comparison preprocessing performed by a comparison determination unit 807 will be described below with reference to FIGS. 9A and 9B.

The comparison determination unit 807 detects in performing pre-comparison processing, skew of the printed product, and performs a skew correction process to correct the skew on the image.

Figure 9A:
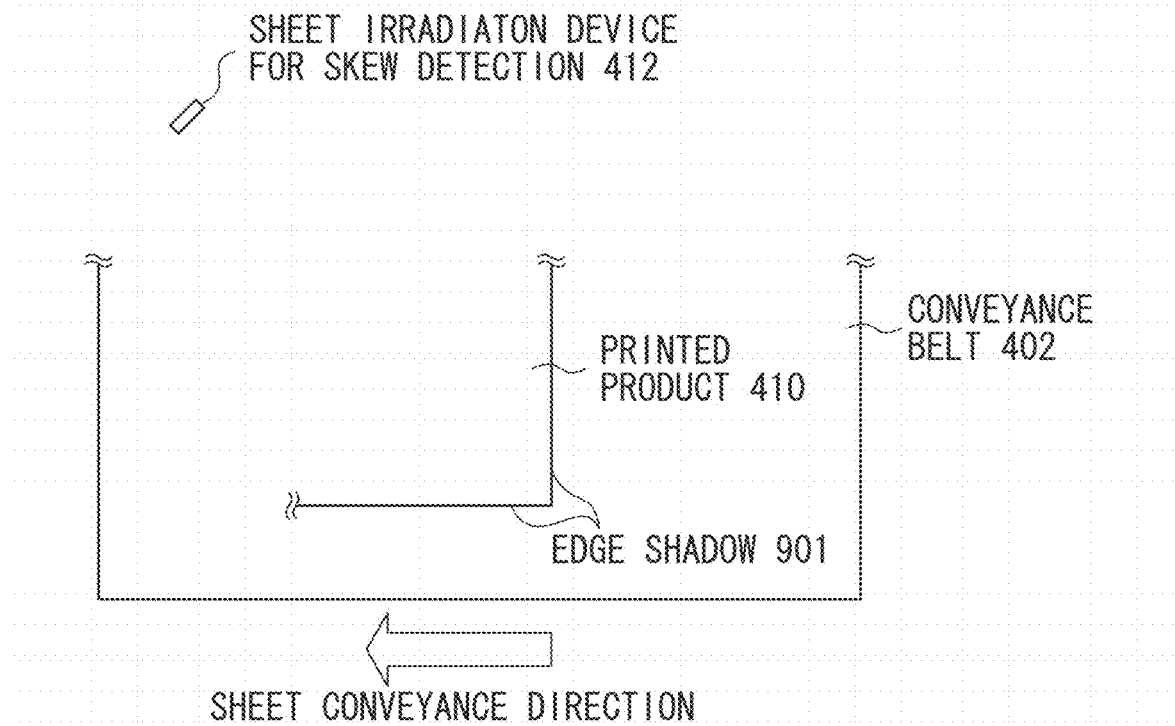
FIGS. 9A and 9B illustrate an algorithm for detecting skewing of a printing sheet.
Figure 9B:
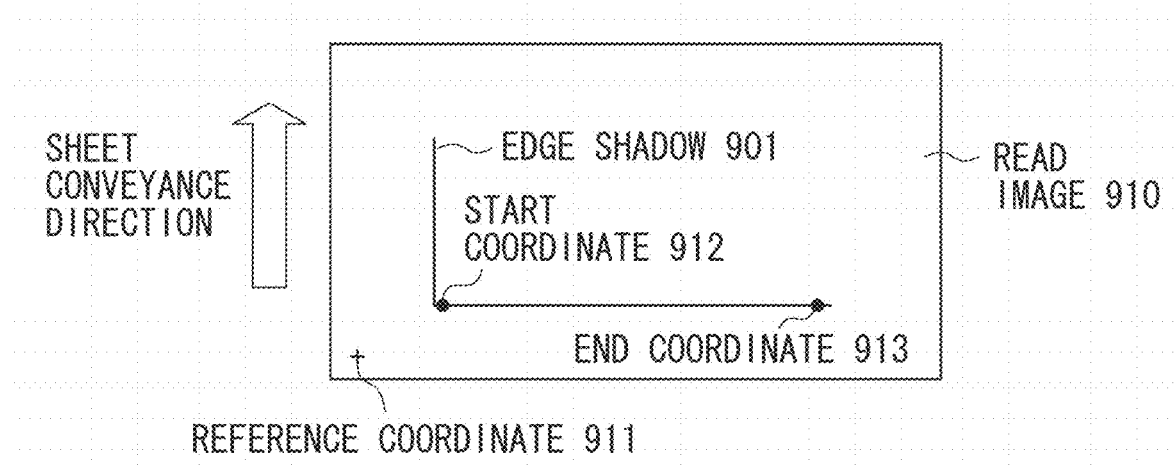

Referring to FIG. 9A, the sheet irradiation device 412 disposed diagonally with respect to a paper conveying direction and above the conveyance belt 402 irradiates the printed product 410 with light. The inspection sensor 403 reads an edge shadow 901 generated at a rear edge of the printed product 410. The comparison determination unit 807 receives from the inspection sensor 403 the image of the edge shadow 901 (i.e., a shadow image) and performs binarization and edge detection on the shadow image. The comparison determination unit 807 thus detects a slope of the shadow image. For example, if the image acquired after performing binarization and edge detection is as illustrated in FIG. 9B, the comparison determination unit 807 determines a reference coordinate 911, and a predetermined starting coordinate 912 and an end coordinate 913 on a read image 910. The comparison determination unit 807 then acquires a reference coordinate 911 a start coordinate 912, and an end coordinate 913 relative to the reference coordinate 911.

If the reference coordinate 911 is (0, 0), the start coordinate 912 is (300, 245), and the end coordinate 913 is (235, 3885), a slope θ (deg) between the start coordinate 912 and the end coordinate 913 is indicated as follows.

$$\theta = \tan^{-1}((235-300)/(3885-245)) = -1.023 (\deg). \quad \text{equation 1}$$

As a result, the comparison determination unit 807 detects that the printed product 410 is skewed by 1.023 degrees in a clockwise direction with respect to the sheet conveyance direction.

The comparison determination unit 807 then rotates the scanned data based on the detected angle and information on a skew direction.

After the comparison determination unit 807 performs the skew correction, the comparison determination unit 807 performs resolution conversion on the scanned data. Further, the comparison determination unit 807 receives the reference data from the image forming apparatus 101 and also performs resolution conversion on the reference data. As a result, the reference data and the scanned data are converted to an equivalent resolution (e.g., 300 dpi) and become comparable with one another.

<The Comparison Process>

After performing the pre-comparison processing, the comparison determination unit 807 inspects the printed product by comparing the scanned data and the reference data. According to the present exemplary embodiment, the comparison determination unit 807 compares the difference among each of pixel values as a density value. However, the pixel value may be other values such as a luminance value.

The comparison determination unit 807 calculates the difference between the density values of each pixel in the scanned data and the reference data, and determines whether printing has been correctly performed according to the difference values. For example, when PDL printing is to be performed, the comparison determination unit 807 uses as the reference data the PDL data which has been rasterized to the bitmap data as described above.

According to the present exemplary embodiment, the comparison determination unit 807 divides both the scanned data and the reference data into 25 blocks (refer to FIG. 10A), and compares the densities in red, green, and blue (RGB) or CMYK for each pixel within each block. Whether to compare in RGB or CMYK can be set according to the image. For example, if the scanned data is color image data, comparison is performed in RGB, and if the scanned data is monochrome image data, comparison is performed in CMYK (i.e., only K).

Figure 10A:
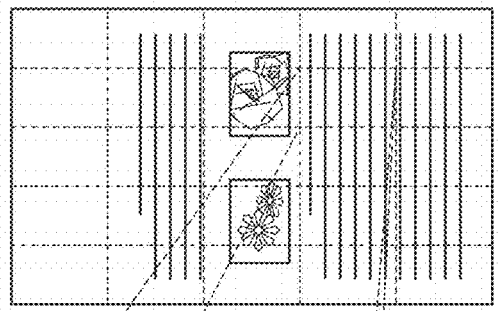
FIGS. 10A, 10B, 10C, and 10D illustrate an inspection process.
Figure 10B:
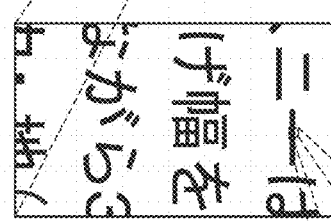
Figure 10C:
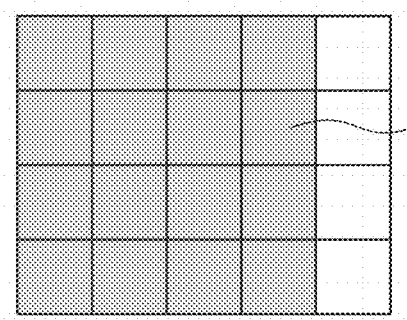
Figure 10D:
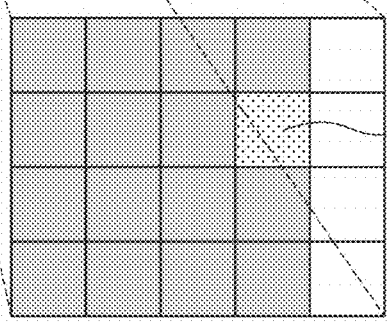

FIGS. 10A, 10B, 10C, and 10D illustrate an example of image comparison by block. More specifically, FIG. 10A illustrates the image read by the inspection sensor 403, and FIG. 10B illustrates one block acquired by the comparison determination unit 807 dividing the image data into blocks. FIG. 10C is an image which is an extracted portion of the reference data, and FIG. 10D is an image of the portion of the scanned data whose pixel position corresponds to the image illustrated in FIG. 10C.

According to the present exemplary embodiment, density data is multivalued data between 0 and 255. The comparison determination unit 807 compares an absolute value of the comparison value, i.e., [scanned data value]-[reference data value], with a preset allowable density difference. If the absolute value of the comparison value is less than or equal to the allowable density difference, the comparison determination unit 807 determines the pixel as an OK pixel. The comparison determination unit 807 determines the pixel as an NG pixel for all other cases. In the case of the example illustrated in FIG. 10D, there is a dust particle at the position of a pixel 1002, so that the pixel value which originally indicates a dark pixel is read as a small density value. In such a case, if the allowable density difference is set to 40, and the density values of a pixel 1001 and the pixel 1002 are 255 and 127 respectively, the relation between the absolute value of the comparison value and the allowable density difference becomes as follows.

|comparison value|=|127−255|=128>40

As a result, the comparison determination unit 807 determines the pixel 1002 as an NG pixel.

The comparison determination unit 807 thus determines each pixel in the block as described above, and acquires an OK determination rate (i.e., number of OK pixels/number of all pixels in the block) for each block. The comparison determination unit 807 then compares the OK determination rate for each block with a preset OK determination threshold value. For example, if the OK determination threshold value is designated as 0.9, and the OK determination rate is 0.96, the OK determination rate (0.96) is greater than the OK determination threshold value (0.9), so that the comparison determination unit 807 determines the block as an OK block. The comparison determination unit 807 performs the above-described process for all blocks, and if all blocks are determined as OK blocks, the printed product is determined as OK (printing is successful). The printed product is determines as NG (printing error) for all other cases.

<The NG Type Determination Process>

The NG type determination process performed in step S1105 illustrated in FIG. 11 will be described below with reference to FIGS. 12A, 12B, 12C, and 13. More specifically, the image forming apparatus 101 performs printing on all residual sheets, and the inspection apparatus 102 reads the printed product and determines the NG type from the read image data.

The types of printing error include a continuous printing error, an intermittent printing error, and a transient printing error. FIGS. 12A, 12B, and 12C illustrate the various types of printing error.

Referring to FIG. 12A, an example of the continuous printing error is a streak 1200 caused by the toner becoming attached to a flag sensor (not illustrated) in the conveyance path. Further, another example of the continuous printing error is an image distortion 1201 caused by a defect in a conveying member, such as abrasion of the conveyance roller. Such a defect causes the sheet to be constantly skewed or distorted during a transfer process when performing printing.

Referring to FIG. 12B, an example of the intermittent printing error is a periodical printing error 1203 (in the example illustrated in FIG. 12B, there is a printing error in one sheet every four sheets). Such an error is caused by a scratch on or soiling of an intermediate transfer belt in the image forming unit 304 or a fixing roller in the fixing unit 305. Another example of the intermittent printing error is edge enhancement (sweeping) 1204 and a white spot. Such printing errors occur when there is a change in a developing condition such as toner deterioration or a change in toner density, or a change in a latent image condition such as a developing contrast potential, so that development property deteriorates.

Referring to FIG. 12C, the examples of the transient printing error are a dropout 1205 which occurs in the transferring process, and a ring mark 1206 which occurs in the developing process.

The NG type determination process will be described below with reference to FIG. 13. In the NG type determination process, the type of the printing error in the printed product determined as NG in step S1101 is determined using the printed residual sheets. In other words, whether the printing error is the continuous printing error, the intermittent printing error, or the transient printing error is determined. According to the present exemplary embodiment, the NG type determination process is performed using a plurality of residual sheets.

In step S1301, a NG type determination unit 808 determines whether the printing error determined as NG by the inspection apparatus 102 is continuous for a predetermined length or longer in the conveyance direction (i.e. a sub-scanning direction). In other words, the NG type determination unit 808 determines whether the place in which the printing error has occurred is characteristic of a continuous printing error. For example, the NG type determination unit 808 makes a determination depending on whether the pixels corresponding to the printing error in the image, determined as NG by inspecting the plurality of residual sheets, continue in the conveyance direction for a predetermined length or longer.

If the printing error occurs continuously for a predetermined length or longer (YES in step S1301), it is likely that the streak 1200 caused by attaching toner or the image distortion 1201 caused by skew or distortion of the sheet in the image forming process has occurred. The process then proceeds to step S1302. In step S1302, the NG type determination unit 808 determines that the printing error is the continuous printing error. Further, the NG type determination unit 808 stores in a storing unit (not illustrated) of the inspection apparatus 102, the following information. The NG type determination unit 808 stores the information indicating that the continuous printing error has occurred, the image of the printed product determined as having the printing error, and the information on where the printing error has occurred in the image. The process then proceeds to step S1307

The NG type determination unit 808 may further classify the continuous printing error into the streak 1200 and the image distortion 1201. For example, the pixels corresponding to the printing error may continuously exist for a predetermined length or longer with respect to the conveyance direction in a region within a predetermined width in a direction perpendicular to the conveyance direction. In such a case, the continuous printing error is determined as the streak 1200. Further, a predetermined number (or an area) of the pixels corresponding to the printing error or more than the predetermined number may continuously exist for a predetermined length or longer in the conveyance direction. In such a case, the continuous printing error is determined as the distortion of the entire image (i.e., image distortion 1201). If the printing error is determined as the streak 1200, which is caused by the toner attaching to the flag sensor (not illustrated), the NG type determination unit 808 can determine that the defective unit (i.e., the unit in which the failure is likely to have occurred) in the image forming apparatus 101 is the flag sensor. Further, if the printing error is determined as the image distortion 1201, which is caused by the abrasion of the conveyance roller in the image forming unit 304, the NG type determination unit 808 can determine that the defective unit in the image forming apparatus 101 is the conveyance roller in the image forming unit. The NG type determination unit 808 may store such information of the defective unit in a storing unit (not illustrated).

In step S1307, the control unit 811 transmits to the image forming apparatus control unit 203 via the external communication unit 812 the instruction (i.e., a control signal) to stop the paper feeding operation, the conveyance operation, and the printing process. The control unit 811 thus functions as the signal transmission unit which transmits the control signal to the image forming apparatus control unit 203.

If the NG type determination unit 808 determines that the printing failure is not continuously occurring in the conveyance direction (NO in step S808), the process proceeds to step S1303. In step S1303, the NG type determination unit 808 detects the coordinates of the position in which the printing error has occurred in the residual sheet, and stores the coordinates in the storing unit (not illustrated) of the inspection apparatus 102.

In step S1304, the NG type determination unit 808 determines whether there is a plurality of printing errors occurring at the same position with respect to a main scanning direction (i.e., the direction perpendicular to the conveyance direction). "The same position" indicates that the two sets of coordinates are within a range of allowable deviation.

If the NG type determination unit 808 determines that the plurality of printing errors occurs at the same positions with respect to the main scanning direction (YES in step S1304), the process proceeds to step S1305. In step S1305, the NG type determination unit 808 determines whether an occurrence period of the plurality of printing errors in the sub-scanning direction matches an operation period of each unit, i.e., whether the positions of the printing errors match the operation period of each unit in the image forming apparatus 101. The operation period of each unit indicates rotation periods of the photosensitive drum 303, the fixing unit 305, and the intermediate transfer belt 308. The NG type determination unit 808 thus determines in step S1304 and step S1305, whether the characteristics of the places in which the printing error has occurred match the characteristics of the intermittent printing error with respect to the occurrence period of the printing error.

The information on the operation period of each unit is previously stored in the storing unit (not illustrated) in the inspection apparatus 102. The NG type determination unit 808 thus makes the determination using the stored information. The unit which is the cause of the printing error may also be determined by calculating the period of the printing error. For example, if the printing error is caused by a scratch on the intermediate transfer belt of a diameter 711 mm, the printing error occurs once in approximately 2232 mm (i.e., 711×π (pi) mm). If the image forming apparatus 101 is using an A3 size paper, the length of the sheet in a longitudinal direction is 411 mm. As a result, the printing error caused by the scratch on the intermediate transfer belt occurs once in every four residual sheets (refer to FIG. 12B), considering the interval between the sheets being conveyed. The NG type determination unit 808 can thus determine by using at least four residual sheets. According to the present exemplary embodiment, the intermediate transfer belt has a long rotation period. However, the intermittent printing error can also be determined with respect to a unit having a short rotation period such as the fixing unit 305. As described above, the NG type determination unit 808 determines the defective unit from the occurrence period of the printing error.

If the NG type determination unit 808 determines that the positions where the printing error occurs in the sub-scanning direction match the operation period of each unit (YES in step S1305), the process proceeds to step S1306. In step S1306, the NG type determination unit 808 determines that the printing error is the intermittent printing error. Further, the NG type determination unit 808 stores in the storing unit (not illustrated) in the inspection apparatus 102, the information indicating that the intermittent printing error has occurred. Furthermore, the NG type determination unit 808 stores in the storing unit the image of the printed product determined as having the printing error, the information on where the printing error has occurred in the image, and the information indicating the defective unit. The process then proceeds to step S1307.

On the other hand, if the NG type determination unit 808 determines that the positions where the printing error occurs are not at the same positions with respect to the main scanning direction (NO in step S1304), or that the positions where the printing error occurs in the sub-scanning direction do not match the operation period of each unit (NO in step S1305), the process proceeds to step S1308. In step S1308, the NG type determination unit 808 determines that the printing error is a transient printing error. Further, the NG type determination unit 808 stores in the storing unit (not illustrated) of the inspection apparatus 102, the information indicating that the transient printing error has occurred, the image of defective unit, the printed product determined as having the printing error, and the information on where the printing error has occurred in the image. The process then proceeds to step S1309.

In step S1309, the control unit 811 transmits to the image forming apparatus control unit 203 via the external communication unit 812 the instruction (i.e., the control signal) for restarting the paper feeding operation, and restarts printing in the image forming apparatus 101. The control unit 811 thus functions as the signal transmission unit which transmits the control signal to the image forming apparatus 101.

By performing the above-described series of processes and determining the NG type of the printing error, the operations of the image forming apparatus can be appropriately controlled.

<Displaying of the Determination Result>

The display process performed in step S1107 illustrated in FIG. 11 will be described below with reference to FIGS. 14A, 14B, 14C, and 14D.

According to the present exemplary embodiment, if the determination result of the inspection apparatus 102 is NG, the type of the printing error (i.e., NG) is determined, and the operations of the image forming apparatus 101 are controlled according to the type of the printing error. In such a case, the determination result displaying unit 810 generates display information indicating the inspection determination result and/or the operation status of the image forming apparatus 101. The determination result displaying unit 810 generates the display information based on each of the information stored in the storing unit (not illustrated) of the inspection apparatus 102. The determination result displaying unit 810 then displays the generated display information on the display unit (not illustrated) of the inspection apparatus 102, to notify the user of the inspection determination result and/or the operation status of the image forming apparatus 101. An example of the display content will be described below.

Figure 14A:
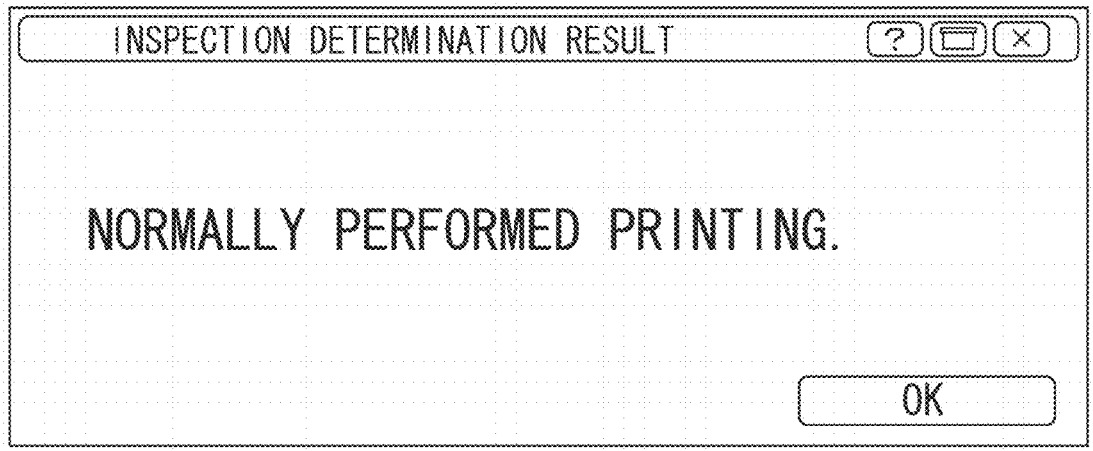
FIGS. 14A, 14B, 14C, and 14D illustrate a determination result displaying unit which displays an inspection result.

If the image forming apparatus 101 has performed printing, and the result of inspecting all printed products is OK (NO in step S1101 illustrated in FIG. 11), the determination result displaying unit 810 notifies the user after printing has been completed that printing has been normally performed. FIG. 14A illustrates such a notification.

Figure 14B:
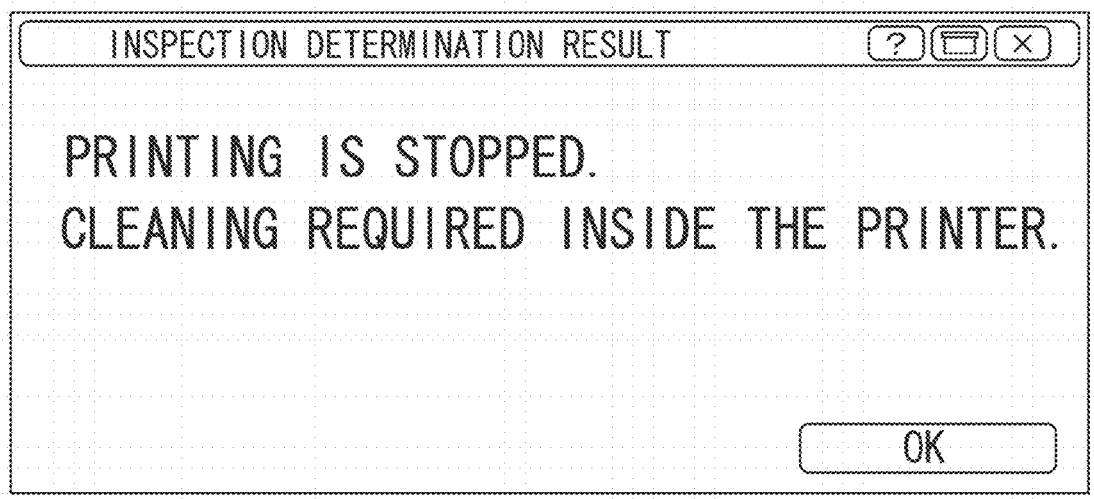

If paper feeding/conveyance control in the image forming apparatus 101 is stopped due to the streak 1200 caused by the attaching toner in the conveyance path (i.e., the printing error is determined as the continuous printing error in step S1105), the determination result displaying unit 810 displays the result as illustrated in FIG. 14B. Referring to FIG. 14B, the user is notified that printing has been stopped due to soiling in the printer. If printing has been stopped due to the image distortion 1201 caused by the skew or the distortion of the sheet while forming the image, the user may be notified that there is a defect in the conveyance components.

Figure 14C:
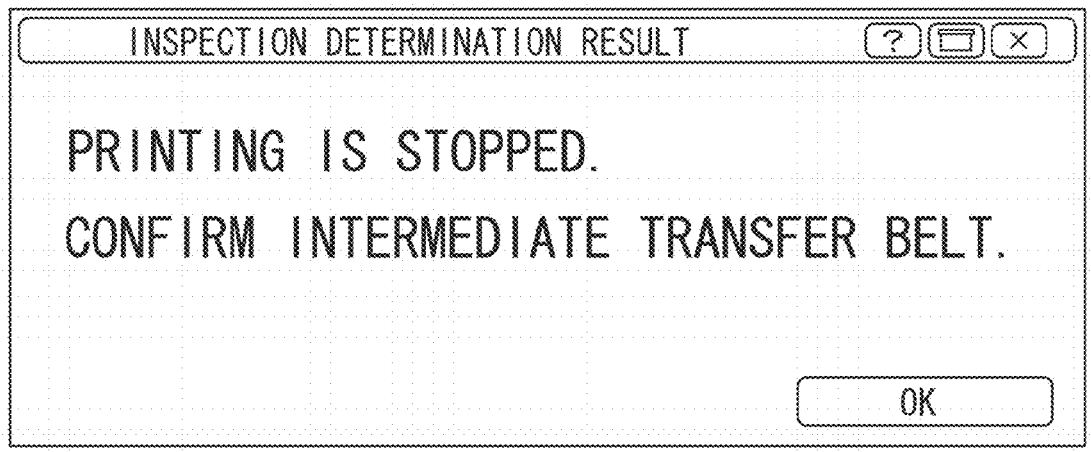

If the printing error 1203 is caused by a scratch on or soiling of a unit such as the photosensitive drum 303, the intermediate transfer belt 308 in the image forming unit 304, or the fixing roller in the fixing unit 305 (i.e., the printing error is determined as the intermittent printing error in step S1105), the determination result displaying unit 810 displays the result as illustrated in FIG. 14C. Referring to FIG. 14C, the user is notified that printing has been stopped, and notified of the unit in which there is a defect. According to the present exemplary embodiment, since the defective unit is indicated, maintenance such as replacing a component in the image forming apparatus can be easily performed by the user or an operator.

Figure 14D:
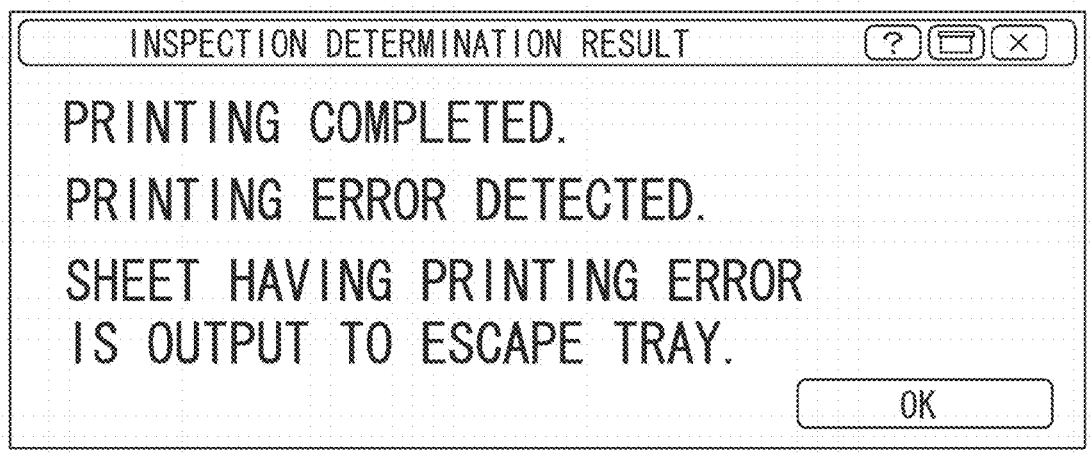

If the transient error has been detected (i.e., the printing error is determined as the transient printing error in step S1105), the determination result displaying unit 810 displays the detection result as illustrated in FIG. 14D. Referring to FIG. 14D, the user is notified that printing has ended, and that a portion of the printed product having the printing error has been output to the escape tray 501.

As described above, the determination result displaying unit 810 changes the content to be displayed (i.e., the display information) on the display unit as illustrated in FIGS. 14A, 14B, 14C, and 14D, according to the inspection determination result. The display information includes the information indicating the operation status of the image forming apparatus 101. The determination result displaying unit 810 thus displays on the display unit the information indicating the defective unit in the image forming apparatus 101 according to the inspection determination result.

According to the present exemplary embodiment, the type of the printing error which the inspection apparatus 102 has determined as NG is determined. The types of printing error to be determined are the continuous printing error, the intermittent printing error, and the transient printing error. The paper feeding/conveyance control of the image forming apparatus is then controlled according to the determined type of printing error, so that it prevents lowering of productivity in printing and wasting of a great amount of printed products. In particular, if the intermittent printing error is detected, the printing process is stopped in the image forming apparatus, so that it prevents wasting of a great amount of sheets. Further, if the transient error is detected, the printing process is continued in the image forming apparatus, so that lowering of productivity can be prevented.

Furthermore, the status of the image forming apparatus 101 is displayed based on the type of the printing error. Efficiency of the maintenance operation performed by the operator can thus be improved.

According to the first exemplary embodiment, as the example of the intermittent printing error determined in the NG type determination process, the printing errors caused by scratching and soiling of the photosensitive drum, the intermediate transfer belt, and the fixing roller are described. Since the above-described printing errors occur due to a mechanical factor of the image forming apparatus, such as the rotation period of each unit, the type of the printing error can be determined from the positions of the printing error.

On the other hand, there is a case where the intermittent printing error is caused by the image data to be printed instead of the mechanical factor of the image forming apparatus. Examples of such printing error are the edge enhancement (sweeping) 1204 and the white spot illustrated in FIG. 12B. Further, the example of the transient printing error is the ring mark 1206 illustrated in FIG. 12C. Such types of printing error are difficult to determine from the rotation period of each unit.

According to the second exemplary embodiment of the present invention, the method for determining the type of printing error which is difficult to determine from only the position where the printing error has occurred based on the rotation period of each unit will be described below. According to the present exemplary embodiment, the process described above with reference to FIG. 13 according to the first exemplary embodiment is replaced by a process described below with reference to FIG. 15. Since the other configurations are similar to those according to the first exemplary embodiment, detailed description will be omitted unless otherwise description is required.

<The NG Type Determination Process>

The NG type determination process according to the present exemplary embodiment will be described below with reference to FIG. 15.

The NG type determination process is performed to determine the type of the printing error which has been determined as NG in the inspection process, similarly to the first exemplary embodiment. The types of printing error are the various printing errors described with reference to FIG. 12 according to the first exemplary embodiment. In the NG type determination process according to the first exemplary embodiment, the type of the printing error is determined based on the rotation period of each unit. On the contrary, in the NG type determination process according to the present exemplary embodiment, the type of the printing error is determined as follows. A reference data inspection process and a shape inspection process are performed based on the image pattern of the reference data and the image pattern of the scanned data with respect to the place in which the printing error has occurred.

According to the present exemplary embodiment, if the inspection determination result is NG in the NG type determination process, the paper feeding control of the paper feeding unit 104 in the image forming apparatus 101 is stopped, similarly to the first exemplary embodiment. Further, the NG type is then determined using the residual sheets which have been previously fed (i.e., the supplied sheets).

The processes performed by the NG type determination unit 808 in step S1501, step S1502, and step S1503 illustrated in FIG. 15 are the same as those in step S1301, step S1302, and step S1307 illustrated in FIG. 13 according to the first exemplary embodiment.

In step S1501, if the NG type determination unit 808 determines that the printing error is not continuously generated in the conveyance direction (NO in step S1501), the process proceeds to step S1504. In step S1504, the NG type determination unit 808 performs the shape inspection process (to be described below) and determines whether the printing error is the transient printing error or the intermittent error.

If the NG type determination unit 808 determines that the printing error is the transient printing error (TRANSIENT PRINTING ERROR in step S1504), the process proceeds to step S1507 and step S1508. Since the processes performed in step S1507 and step S1508 are the same as those performed in step S1308 and step S1309 according to the first exemplary embodiment, description will be omitted.

If the NG type determination unit 808 determines that the printing error is the intermittent printing error (INTERMITTENT PRINTING ERROR in step S1504), the process proceeds to step S1505. In step S1505, the NG type determination unit 808 performs the reference data inspection process (to be described in detail below) and determines whether the printing error is the intermittent or transient printing error. In other words, in step S1504 and step S1505, the NG type determination unit 808 determines whether the characteristics of the place at which the printing error has occurred match the characteristics of the intermittent or transient printing error. The NG type determination unit 808 makes the determination based on the shape of the printing error or the image pattern at the error place. In such a case, if the defective unit which causes the printing error can be determined, the NG type determination unit 808 stores in step S1506 the information indicating the defective unit in the storing unit (not illustrated).

If the NG type determination unit 808 determines that the printing error is the intermittent printing error (INTERMITTENT PRINTING ERROR in step S1505), the process proceeds to step S1506. In step S1506, the NG type determination unit 808 determines that the printing error is the intermittent printing error, similarly ton step S1306 according to the first exemplary embodiment. The process then proceeds to step S1503. If the NG type determination unit 808 determines that the printing error is the transient printing error (TRANSIENT PRINTING ERROR in step S1505), the process proceeds to step S1507 and step S1508.

<The Shape Inspection Process>

The shape inspection process performed in step S1504 will be described below. The shape inspection process is performed using a database (not illustrated) in the inspection apparatus 102, to determine whether the shape of the generated printing error is characteristic of the intermittent printing error or the transient printing error. The printing error having a characteristic shape is a printing error appearing on the printed product as a fixed shape, among the printing errors that occur in each of the processes (i.e., developing, transferring, and fixing processes) in the printing process.

According to the present exemplary embodiment, the shape inspection process is sequentially performed at each place where the printing error has occurred, and ends when the type of the printing error has been determined. However, the present invention is not limited to such a configuration. The shape inspection process may be performed at all places in which the printing error has occurred, and the type of the printing error may be determined based on the type of the printing error which appears most frequently.

The method for determining the ring mark 1206 will be described below as an example of the shape inspection process.

The ring mark 1206 which is a printing error that occurs in the developing process is caused by discharging of a metal powder included in the toner while the image forming apparatus 101 performs the developing process. The characteristic shape of the printing error is illustrated in FIG. 12C. Since the discharge phenomenon occurs transiently, the ring mark 1206 can be determined as a transient printing error.

As a result, if the shape of the place where the printing error has occurred (i.e., the image pattern of the scanned data at the place where the printing error has occurred) matches the information on the shape of the ring mark 1206, it can be determined that the ring mark 1206, i.e., a transient printing error, has occurred.

The ring mark 1206 is an example of the printing error having a characteristic shape, and the database stores the information on the characteristic shapes of other transient printing errors and also of the intermittent printing errors.

The type of the printing error can thus be detected at high speed by using such a database and verifying the shape of the printing error with the information of the shapes stored in the database.

The database storing only the shapes of the transient printing errors may also be used. In such a case, if the shape of the printing error does not match the information in the database, it can be determined that the printing error is the intermittent printing error. Further, the database storing only the shapes of the intermittent printing errors may also be used. In such a case, if the shape of the printing error does not match the information in the database, it can be determined that the printing error is the intermittent transient printing error.

<The Reference Data Inspection Process>

The reference data inspection process performed in step S1505 will be described below. The reference data inspection process is performed to determine whether the characteristics of the image pattern of the reference data in the printing error generation place matches the characteristics of the intermittent printing error or the transient printing error. The determination is made by comparing the image pattern with a matching pattern stored in the database (not illustrated) in the inspection apparatus 102.

According to the present exemplary embodiment, the reference data inspection process is sequentially performed at each place where the printing error has occurred, and ends when the type of the printing error has been determined. However, the present invention is not limited to such a configuration. In other words, the s reference data inspection process may be performed at all places in which the printing error has occurred, and the type of the printing error may be determined based on the type of the printing error which occurs most frequently.

The method for determining the edge enhancement (sweeping) 1204 and the dropout 1205 will be described below as an example of the reference data inspection process.

The edge enhancement (sweeping) 1204 is a phenomenon in which an excessive amount of toner is mounted, caused by a change in the developing condition due to toner deterioration, or the change in the latent image condition such as the developing contrast potential. The edge enhancement (sweeping) 1204 occurs particularly where the density of a region adjacent to the trailing edge in the conveyance direction of a halftone image region is 0 in the image pattern of the reference data.

Further, once the developing condition or the latent image condition changes, the development property cannot be corrected unless maintenance is performed.
The printing error thus occurs every time the reference data matches the condition for the edge enhancement (sweeping) 1204. In other words, the edge enhancement (sweeping) 1204 is not a printing error that occurs continuously in the conveyance direction or transiently. The edge enhancement 1204 occurs when the image pattern of the reference data matches the condition for generating the printing error.

Occurrence of such an intermittent printing error can be predicted by referring to a specific image pattern of the reference data, so that the intermittent printing error can be treated as the printing error having a known occurrence period.

As a result, if it determined that density data of the pixel adjacent to the edge portion of the image in the reference data is 0 when referring to the reference data at position corresponding to the printing error occurrence position, it can be determined that the edge enhancement (sweeping) 1204, i.e., the intermittent printing error, is occurring.

The edge enhancement (sweeping) 1204 occurs even in the edge portion of the image in which a high density region and a low density portion are adjacent to one another. In such a case, the toner is excessively mounted in the high density region and insufficiently mounted in the low density region in the edge portion. The edge enhancement (sweeping) 1204 and the white spot thus occur. Such printing errors can be determined as the intermittent printing errors when the reference data corresponding to the positions is referred to where the printing errors occur, and it is detected that there is a predetermined density difference between the two adjacent regions in the edge portion of the reference data.

Since the edge enhancement (sweeping) 1204 is generated due to a change in the developing condition or the latent image condition, the defective unit is one of the laser exposing unit 302, the photosensitive drum 303, and the developing unit in the mage forming unit 304. The NG type determination unit 808 may thus store in the storing unit (not illustrated) in step S1508 the information indicating the defective unit.

Further, the dropout 1205 which occurs in the transfer process when the image forming apparatus 101 prints an image is caused by peeling of the toner while transferring the sheet. Such a printing error transiently occurs regardless of the image pattern of the reference data, so that the dropout 1205 is a transient printing error.

As a result, if the density data of the scanned data indicates that the density is 0 even when the density data of the reference data corresponding to the position where the printing error has occurred indicates that the density is other than 0, it can be determined that the dropout 1205, i.e., a transient printing error, has occurred.

As described above, according to the present exemplary embodiment, the intermittent printing error and the transient printing error which cannot be determined from only the position of the printing error appearing on the printed product can be determined. Such printing errors can be determined by inspecting the shape of the printing error and the reference data corresponding to the place where the printing error has occurred.

Figure 16B:
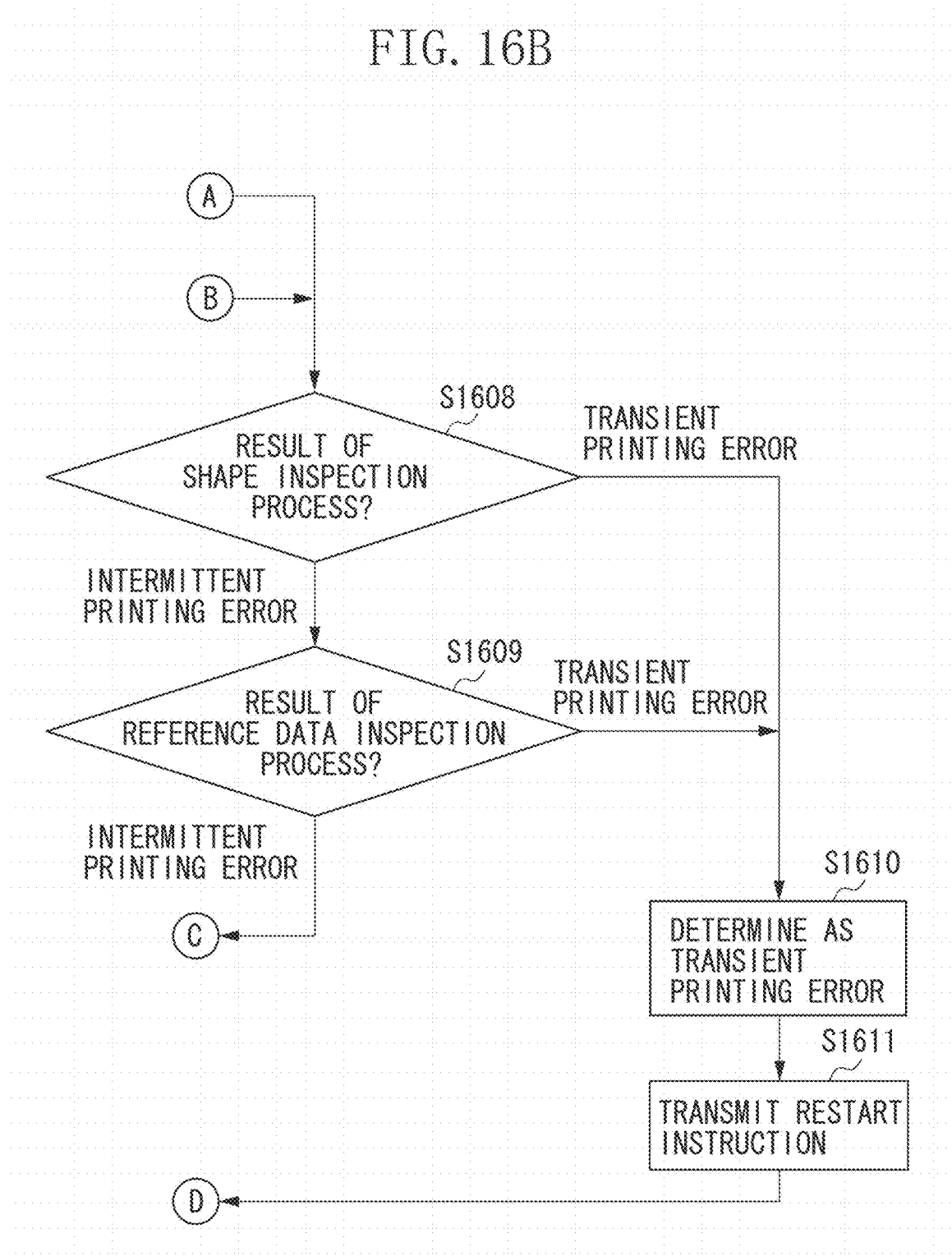

The third exemplary embodiment will be described below. As illustrated in the flowchart of FIG. 16, the NG type determination process which is a combination of the NG type determination processes according to the first exemplary embodiment illustrated in FIG. 13 and according to the second exemplary embodiment illustrated in FIG. 15 may be performed. FIG. 16 is similar to the process in which the processes of step S1504 and step S1505 illustrated in FIG. 15 are performed before the process of step S1308 illustrated in FIG. 13.

As a result, both types of printing errors which are determinable from the position of the printing error occurring on the printed product, and from the shape of the place of the printing error occurring on the printed product or from the reference data of position corresponding to the printing error occurrence position can be checked. Accuracy of the determination can thus be improved.

According to the above-described exemplary embodiments, each processing unit in the inspection apparatus 102 is realized by a hardware circuit. However, the functions realized by the hardware circuit may be realized by a central processing unit (CPU) in the inspection apparatus 102 executing a program stored in a hard disk drive (HDD). In such a case, the HDD stores a computer program for performing the inspection process according to the above-described exemplary embodiments, and the CPU in the inspection apparatus 102 loads the computer program in a random access memory (RAM) to execute the program.

Aspects of the present invention can also be realized by providing to a system or an apparatus a computer-readable storage medium that stores a program code of software for performing the functions of the above-described exemplary embodiments. Further, the present invention can also be realized by the computer (or a CPU or a micro-processing unit (MPU)) in the system or the apparatus reading and executing the program code stored in the storage medium.

In such a case, the program code read from the storage medium performs the functions of the above-described exemplary embodiments, and the storage medium storing the program code constitutes the present invention.

The storage medium for supplying the program code can be a flexible disk, a HD, an optical disk, an opto-magnetic disk, a compact disk (CD)-read only memory (ROM), a CD-record (R), a non-volatile memory card, or a ROM.

Further, the functions of the above-described exemplary embodiments are realized by the computer reading and executing the program code. Furthermore, an operating system (OS) running on the computer can perform a portion or all of the actual process according to the instructions of the program code, and realize the above-described exemplary embodiments.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-254848 filed Nov. 22, 2011, which is hereby incorporated by reference herein in its entirety.

What is claimed is:

1. An inspection apparatus having a printing unit configured to print image data on a sheet having been fed by a paper feeding unit and discharge the sheet on which the image data has been printed to a paper output tray and inspecting a sheet on which printing has been performed by the printing unit, the inspection apparatus comprising:
a reading unit configured to read the sheet on which printing has been performed and acquire a read image;
a first determination unit configured to determine whether there is any printing error in the read image by comparing the read image with a reference image;
a second determination unit configured to determine whether, as the printing error determined by the first determination unit, a plurality of printing errors has occurred at a same position with respect to a main scanning direction and whether the plurality of printing errors has occurred periodically in a certain fixed cycle of appearance in a sub-scanning direction; and
a control unit configured to control, in a case where the second determination unit determines that the plurality of printing errors determined by the first determination unit has occurred at the same position with respect to the main scanning direction and that the plurality of printing errors has occurred periodically in the certain fixed cycle of appearance in the sub-scanning direction, the printing unit to stop the feeding of a sheet from the paper feeding unit,
wherein, in a case where it is determined by the second determination unit that the plurality of printing errors determined by the first determination unit has occurred at the same position with respect to the main scanning direction but not periodically in the certain fixed cycle of appearance in the sub-scanning direction, the control unit controls the printing unit to discharge a sheet from which the read image has been obtained to an escape tray different from the paper output tray and to restart feeding of a sheet from the paper feeding unit.

2. The inspection apparatus according to claim 1, wherein the control unit performs, in the case where the first determination unit detects by comparing the reference image and the read image that a printing error has occurred, first control to stop feeding sheets to the printing unit and not to stop the printing unit from printing on previously fed sheets,
wherein the first determination unit determines a printing error has occurred in an image which has been printed on a sheet while the control unit is performing the first control, a type of the printing error, and
wherein the control unit performs control, in the case where the second determination unit determines that the plurality of printing errors has occurred at the same position with respect to the main scanning direction and that the plurality of printing errors has occurred periodically in the certain fixed cycle of appearance in the sub-scanning direction, to stop the printing unit from performing subsequent printing.

3. The inspection apparatus according to claim 1, further comprising a display unit configured to display a result of the printing process based on the printing error determined by the second determination unit.

4. The inspection apparatus according to claim 3, wherein the display unit displays, in the case where the control unit performs control to stop the printing unit from printing, information indicating a defective unit included in the printing unit, based on the printing error determined by the second determination unit.

5. The inspection apparatus according to claim 1, wherein the printing unit sequentially feeds from the paper feeding unit a plurality of sheets to perform the printing process,
wherein the first determination unit detects a printing error on a sheet on which the printing process has been performed by comparing the reference image and the read image;
wherein the control unit stops, in the case where the first determination unit has detected a printing error, feeding sheets to the printing unit and displays information about the effect that printing process should be performed on the plurality of the fed sheets; and
wherein the second determination unit determines, with respect to the plurality of fed sheets on which the printing process has been performed, whether the plurality of printing errors determined by the first determination unit has occurred at the same position with respect to the main scanning direction and whether the plurality of printing errors has occurred periodically in the certain fixed cycle of appearance in the sub-scanning direction.

6. The inspection apparatus according to claim 1, wherein the printing unit associated with the inspection apparatus includes any one of a photosensitive drum, a fixing unit and an intermediate transfer belt.

7. The inspection apparatus according to claim 1,
wherein the certain fixed cycle is an operation cycle of each unit pertaining to print processing performed by the printing unit.

8. The inspection apparatus according to claim 1, further comprising:
a memory configured to store information on the position at which it is determined by the determination unit that the printing error has occurred; and
wherein the second determination unit performs determination processing on the basis of the information stored in the memory on the position.

9. An inspection method performed by an inspection apparatus having a printing unit configured to print image data on a sheet having been fed by a paper feeding unit and discharge the sheet on which the image data has been printed to a paper output tray and inspecting a sheet on which printing has been performed by the printing unit, the method comprising:
reading the sheet on which printing has been performed and acquiring a read image;
determining whether there is any printing error in the read image by comparing the read image with a reference image;
determining whether a plurality of printing errors has occurred at a same position with respect to a main scanning direction and whether the plurality of printing errors has occurred periodically in a certain fixed cycle of appearance in a sub-scanning direction or not; and
controlling, in a case where it is determined that the plurality of printing errors has occurred at the same position with respect to the main scanning direction and that the plurality of printing errors has occurred periodically in the certain fixed cycle of appearance in the sub-scanning direction, the printing unit to stop the feeding of a sheet from the paper feeding unit,
wherein, in a case where it is determined by the second determination unit that the plurality of printing errors determined by the first determination unit has occurred at the same position with respect to the main scanning direction but not periodically in the certain fixed cycle of appearance in the sub-scanning direction,
the control unit controls the printing unit to discharge a sheet from which the read image has been obtained to an escape tray different from the paper output tray and to restart feeding of a sheet from the paper feeding unit.

10. The method according to claim 9, further comprising:
controlling, in the case where it is detected by comparing the reference image and the read image that a printing error has occurred, to stop feeding sheets to the printing unit and not to stop the printing unit from printing on previously fed sheets;
determining, a printing error has occurred on an image on a sheet which has been printed while performing the controlling, a type of the printing error; and
stopping, in the case where it is determined that the plurality of printing errors has occurred at the same position with respect to the main scanning direction and that the plurality of printing errors has occurred periodically in the certain fixed cycle of appearance in the sub-scanning direction, feeding sheets to the printing unit.

11. The method according to claim 9, further comprising displaying, in the case where control is performed in the printing control to stop the printing unit from performing printing, information indicating a defective unit included in the printing unit, based on the determined printing error.

12. A non-transitory computer-readable storage medium storing a program for causing an inspection apparatus having a printing unit configured to print image data on a sheet having been fed by a paper feeding unit and discharge the sheet on which the image data has been printed to a paper output tray and inspecting a sheet on which printing has been performed by the printing unit to perform an inspection method, the method comprising:
reading the sheet on which printing has been performed and acquiring a read image;
determining whether there is any printing error in the react image by comparing the read image with a reference image;
determining whether a plurality of printing errors has occurred at a same position with respect to a main scanning direction and whether the plurality of printing errors has occurred periodically in a certain fixed cycle of appearance in a sub-scanning direction; and
controlling, in a case where it is determined that the plurality of printing errors has occurred at the same position with respect to the main scanning direction and that the plurality of printing errors has occurred periodically in the certain fixed cycle of appearance in the sub-scanning direction, the printing unit to stop the feeding of a sheet from the paper feeding unit,
wherein, in a case where it is determined by the second determination unit that the plurality of printing errors determined by the first determination unit has occurred at the same position with respect to the main scanning direction but not periodically in the certain fixed cycle of appearance in the sub-scanning direction,
the control unit controls the printing unit to discharge a sheet from which the read image has been obtained to an escape tray different from the paper output tray and to restart feeding of a sheet from the paper feeding unit.

* * * * *